(12) United States Patent
Eisenberger

(10) Patent No.: US 9,925,488 B2
(45) Date of Patent: Mar. 27, 2018

(54) ROTATING MULTI-MONOLITH BED MOVEMENT SYSTEM FOR REMOVING $CO_2$ FROM THE ATMOSPHERE

(71) Applicants: Peter Eisenberger, New York, NY (US); Graciela Chichilnisky, New York, NY (US)

(72) Inventor: Peter Eisenberger, Princeton, NJ (US)

(*) Notice: Subject to any disclaimer, the term of this patent is extended or adjusted under 35 U.S.C. 154(b) by 0 days.

(21) Appl. No.: 14/587,716

(22) Filed: Dec. 31, 2014

(65) Prior Publication Data
US 2015/0273385 A1    Oct. 1, 2015

Related U.S. Application Data

(63) Continuation-in-part of application No. 13/098,370, filed on Apr. 29, 2011, now Pat. No. 8,500,855, and
(Continued)

(51) Int. Cl.
*B01D 53/02* (2006.01)
*B01D 53/08* (2006.01)
*B01D 53/06* (2006.01)

(52) U.S. Cl.
CPC .............. *B01D 53/08* (2013.01); *B01D 53/06* (2013.01); *B01D 2252/204* (2013.01);
(Continued)

(58) Field of Classification Search
CPC ........ B01D 2252/204; B01D 2253/104; B01D 2253/106; B01D 2253/202;
(Continued)

(56) References Cited

U.S. PATENT DOCUMENTS 3,466,138 A    9/1969 Spiegler et al.
3,491,031 A    1/1970 Stoneburner
(Continued)

FOREIGN PATENT DOCUMENTS

CN    1709553    12/2005
DE    200 01 385 U1    9/2000
(Continued)

OTHER PUBLICATIONS

Stolaroff, Joshuah et al. "A Pilot-scale prototype contractor for CO2 capture from ambient air; cost and energy requirements." (2006) www.ucalgary.ca/~keith/papers/84.Stolaroff.Air . . . .
(Continued)

*Primary Examiner* — Christopher P Jones
(74) *Attorney, Agent, or Firm* — Paul J. Sutton; Barry G. Magidoff

(57) ABSTRACT

A system for removing carbon dioxide from a carbon dioxide laden gas mixture, the system comprising two groups of carbon dioxide removal structures, each removal structure within each group comprising a porous solid mass substrate supported on the structure and a sorbent that is capable of adsorbing or binding to carbon dioxide, to remove carbon dioxide from a gas mixture, the sorbent being supported upon the surfaces of the porous mass substrate solid; an endless loop support for each of the groups of the removal structures, the endless loop support being so arranged as to move the support structures of each group along a closed curve while being exposed to a stream of the gas mixture; and a sealable regeneration box at one location along each of the endless loop supports, in which, when a porous solid mass substrate is sealed in place therein, carbon dioxide adsorbed upon the sorbent is stripped from the sorbent and the sorbent regenerated; each removal structural supporting a porous substrate in a position to be exposed to
(Continued)

a flow of carbon dioxide laden gas mixture so as to allow for the removal of $CO_2$ from the gas mixture; the number of removal structures to the number of regeneration boxes being directly determined by the ratio of the time to adsorb $CO_2$, from a base level to desired level on the sorbent, to the time to strip the $CO_2$ from the desired level back to the base level.

10 Claims, 21 Drawing Sheets

Related U.S. Application Data a continuation-in-part of application No. 13/886,207, filed on May 2, 2013, now Pat. No. 9,028,592, and a continuation-in-part of application No. 13/925,679, filed on Jun. 24, 2013, now abandoned.

(60) Provisional application No. 61/922,338, filed on Dec. 31, 2013, provisional application No. 61/443,061, filed on Feb. 15, 2011, provisional application No. 61/351,216, filed on Jun. 3, 2010, provisional application No. 61/330,108, filed on Apr. 30, 2010.

(52) U.S. Cl.
CPC .. *B01D 2253/104* (2013.01); *B01D 2253/106* (2013.01); *B01D 2253/202* (2013.01); *B01D 2253/25* (2013.01); *B01D 2253/342* (2013.01); *B01D 2257/504* (2013.01); *B01D 2259/4009* (2013.01); *B01D 2259/4067* (2013.01); *B01D 2259/65* (2013.01); *Y02C 10/08* (2013.01)

(58) Field of Classification Search
CPC .......... B01D 2253/25; B01D 2257/504; B01D 2259/4009; B01D 53/06; B01D 53/08; Y02C 10/08
See application file for complete search history.

(56) References Cited

U.S. PATENT DOCUMENTS

| | | | |
|---|---|---|---|
| 3,615,196 A * | 10/1971 | Welty | B01D 53/8609 423/244.02 |
| 3,725,387 A | 4/1973 | McClendon et al. | |
| 3,865,924 A * | 2/1975 | Gidaspow | B01D 53/02 422/223 |
| 3,880,981 A | 4/1975 | Garingarao | |
| 3,948,627 A | 4/1976 | Schwarz et al. | |
| 4,047,894 A | 9/1977 | Kuhl et al. | |
| 4,152,217 A | 5/1979 | Eisenberg et al. | |
| 4,197,421 A | 4/1980 | Steinberg | |
| 4,239,515 A | 12/1980 | Yanagioka et al. | |
| 4,243,613 A | 1/1981 | Brockhaus et al. | |
| 4,285,918 A | 8/1981 | Gustafson | |
| 4,455,153 A | 6/1984 | Jakahi | |
| 4,472,178 A | 9/1984 | Kumar | |
| 4,497,641 A | 2/1985 | Brown et al. | |
| 4,528,248 A | 7/1985 | Galbraith et al. | |
| 4,579,723 A | 4/1986 | Weltmer et al. | |
| 4,711,645 A | 12/1987 | Kumar | |
| 4,762,528 A | 8/1988 | Reichl | |
| 4,808,317 A | 2/1989 | Berry et al. | |
| 4,810,266 A | 3/1989 | Zinnen et al. | |
| 4,822,383 A | 4/1989 | Brose et al. | |
| 5,057,128 A * | 10/1991 | Panzica | B01D 53/0415 55/400 |
| 5,061,455 A | 10/1991 | Brose et al. | |
| 5,087,597 A | 2/1992 | Leal et al. | |
| 5,364,887 A | 11/1994 | Konig et al. | |
| 5,376,614 A | 12/1994 | Birbara et al. | |
| 5,424,051 A | 6/1995 | Nagji et al. | |
| 5,443,804 A | 8/1995 | Parker et al. | |
| 5,492,683 A | 2/1996 | Birbara et al. | |
| 5,520,894 A | 5/1996 | Heesink et al. | |
| 5,593,475 A | 1/1997 | Minh | |
| 5,595,238 A | 1/1997 | Mark et al. | |
| 5,635,142 A | 6/1997 | Ichiki et al. | |
| 5,642,630 A | 7/1997 | Abdelmalek et al. | |
| 5,653,785 A | 8/1997 | Horio et al. | |
| 5,702,508 A * | 12/1997 | Moratalla | B01D 53/06 55/523 |
| 5,871,646 A | 2/1999 | Jones et al. | |
| 5,876,488 A | 3/1999 | Birbara et al. | |
| 5,879,432 A | 3/1999 | Morlec et al. | |
| 5,906,806 A | 5/1999 | Clark | |
| 5,928,806 A | 7/1999 | Olah et al. | |
| 5,958,353 A | 9/1999 | Eyal | |
| 6,004,381 A | 12/1999 | Rohrbach et al. | |
| 6,048,509 A | 4/2000 | Kawai et al. | |
| 6,090,186 A | 7/2000 | Spencer | |
| 6,106,595 A | 8/2000 | Spencer | |
| 6,117,404 A | 9/2000 | Mimura et al. | |
| 6,174,506 B1 | 1/2001 | Chakravarti et al. | |
| 6,250,298 B1 | 6/2001 | Gonda et al. | |
| 6,350,298 B1 | 2/2002 | Su et al. | |
| 6,364,938 B1 | 4/2002 | Birbara et al. | |
| 6,387,337 B1 | 5/2002 | Pennline et al. | |
| 6,500,236 B2 | 12/2002 | Suzuki et al. | |
| 6,521,026 B1 * | 2/2003 | Goto | C01B 31/20 96/122 |
| 6,540,936 B1 | 4/2003 | Takagi et al. | |
| 6,547,854 B1 | 4/2003 | Gray et al. | |
| 6,596,248 B2 * | 7/2003 | Schimkat | B01D 53/06 423/220 |
| 6,612,485 B2 | 9/2003 | Lackner et al. | |
| 6,780,227 B2 * | 8/2004 | DuBose | B01D 53/06 96/125 |
| 6,783,738 B1 * | 8/2004 | Sasaki | B01D 53/06 422/171 |
| 6,790,430 B1 | 9/2004 | Lackner et al. | |
| 6,797,039 B2 | 9/2004 | Spencer | |
| 6,800,331 B2 | 10/2004 | Bilyk et al. | |
| 6,873,267 B1 | 3/2005 | Tubel et al. | |
| 6,890,497 B2 | 5/2005 | Rau et al. | |
| 6,908,497 B1 | 6/2005 | Sirwardane | |
| 6,929,680 B2 | 8/2005 | Krushnevych et al. | |
| 6,960,242 B2 | 11/2005 | Leitch et al. | |
| 7,041,272 B2 * | 5/2006 | Keefer | B01D 53/047 422/211 |
| 7,128,777 B2 | 10/2006 | Spencer | |
| 7,132,090 B2 | 11/2006 | Dziedzic et al. | |
| 7,141,859 B2 | 11/2006 | DeBoer et al. | |
| 7,288,136 B1 | 10/2007 | Gray et al. | |
| 7,385,012 B2 | 6/2008 | Chang et al. | |
| 7,452,406 B2 | 11/2008 | Little et al. | |
| 7,584,171 B2 | 9/2009 | Guan et al. | |
| 7,655,069 B2 | 2/2010 | Wright et al. | |
| 7,658,994 B2 | 2/2010 | Lakshmi | |
| 7,666,250 B1 | 2/2010 | Blenco et al. | |
| 7,699,909 B2 | 4/2010 | Lackner et al. | |
| 7,708,806 B2 | 5/2010 | Wright et al. | |
| 7,795,175 B2 | 9/2010 | Olah et al. | |
| 7,799,310 B2 | 9/2010 | Lackner et al. | |
| 7,827,778 B2 | 11/2010 | Finkenrath et al. | |
| 7,833,328 B2 | 11/2010 | Lackner et al. | |
| 7,909,911 B2 | 3/2011 | Lackner et al. | |
| 7,947,239 B2 | 5/2011 | Lackner et al. | |
| 7,976,897 B2 | 7/2011 | Bhat et al. | |
| 7,988,766 B2 | 8/2011 | White et al. | |
| 7,993,432 B2 | 8/2011 | Wright et al. | |
| 8,043,594 B2 | 10/2011 | Lackner et al. | |
| 8,052,776 B2 | 11/2011 | Jiang et al. | |
| 8,083,836 B2 | 12/2011 | Wright et al. | |
| 8,088,197 B2 * | 1/2012 | Wright | B01D 53/02 95/139 |
| 8,118,914 B2 | 2/2012 | Liu et al. | |
| 8,123,842 B2 | 2/2012 | Pan et al. | |
| 8,133,305 B2 | 3/2012 | Lackner et al. | |
| 8,163,066 B2 | 4/2012 | Eisenberger | |
| 8,491,705 B2 | 7/2013 | Choi et al. | |

(56) References Cited

U.S. PATENT DOCUMENTS

| | | | |
|---|---|---|---|
| 8,500,855 B2 | 8/2013 | Eisenberger | |
| 8,500,857 B2 * | 8/2013 | Eisenberger | B01D 53/0407 95/107 |
| 8,529,664 B2 | 9/2013 | Deckman et al. | |
| 8,894,747 B2 | 11/2014 | Eisenberger et al. | |
| 8,974,576 B2 * | 3/2015 | Gupta | B01D 53/06 95/139 |
| 9,266,051 B2 * | 2/2016 | Wright | B01D 53/02 |
| 9,403,116 B2 * | 8/2016 | Fleming, Jr. | A23L 3/3427 |
| 2001/0004895 A1 | 6/2001 | Preiss | |
| 2001/0047995 A1 | 12/2001 | Pozgainer et al. | |
| 2002/0000260 A1 | 1/2002 | Palvoelgyi et al. | |
| 2002/0083833 A1 | 7/2002 | Nalette et al. | |
| 2002/0187372 A1 | 12/2002 | Hall et al. | |
| 2003/0061906 A1 | 4/2003 | Knunz et al. | |
| 2003/0075012 A1 | 4/2003 | Knunz et al. | |
| 2004/0142888 A1 | 7/2004 | Manne et al. | |
| 2004/0213705 A1 | 10/2004 | Blencoe | |
| 2004/0229045 A1 | 11/2004 | Hesselmans et al. | |
| 2004/0253159 A1 | 12/2004 | Hakka et al. | |
| 2005/0027081 A1 | 2/2005 | Okushita et al. | |
| 2005/0096438 A1 | 5/2005 | Chang | |
| 2005/0142296 A1 | 6/2005 | Lakshmi | |
| 2005/0180910 A1 | 8/2005 | Park et al. | |
| 2006/0051274 A1 | 3/2006 | Wright et al. | |
| 2006/0084063 A1 | 4/2006 | Costa et al. | |
| 2006/0101945 A1 | 5/2006 | Lackner et al. | |
| 2006/0105419 A1 | 5/2006 | Blankenberg et al. | |
| 2006/0165574 A1 | 7/2006 | Sayari | |
| 2006/0168940 A1 | 8/2006 | Offenhuber et al. | |
| 2006/0178989 A1 | 8/2006 | Lackner et al. | |
| 2006/0186562 A1 | 8/2006 | Wright et al. | |
| 2006/0188423 A1 | 8/2006 | Cadours et al. | |
| 2006/0289003 A1 | 12/2006 | Lackner et al. | |
| 2007/0004023 A1 | 1/2007 | Trachtenberg | |
| 2007/0033767 A1 | 2/2007 | Dodson et al. | |
| 2007/0065490 A1 | 3/2007 | Schaberg et al. | |
| 2007/0068525 A1 | 3/2007 | Offenhuber et al. | |
| 2007/0086909 A1 | 4/2007 | Abenthung et al. | |
| 2007/0187247 A1 | 8/2007 | Lackner et al. | |
| 2007/0209349 A1 | 9/2007 | Ripper et al. | |
| 2008/0031801 A1 | 2/2008 | Lackner et al. | |
| 2008/0064184 A1 | 3/2008 | Lackner et al. | |
| 2008/0087165 A1 | 4/2008 | Wright et al. | |
| 2008/0090480 A1 | 4/2008 | Akimoto et al. | |
| 2008/0112868 A1 | 5/2008 | Blencoe | |
| 2008/0124666 A1 | 5/2008 | Stocker et al. | |
| 2008/0138265 A1 | 6/2008 | Lackner et al. | |
| 2008/0187755 A1 | 8/2008 | Herfert et al. | |
| 2008/0190567 A1 | 8/2008 | Winsness et al. | |
| 2008/0199613 A1 | 8/2008 | Bhat | |
| 2008/0227169 A1 | 9/2008 | Benson et al. | |
| 2008/0250715 A1 | 10/2008 | Cooper et al. | |
| 2008/0264029 A1 | 10/2008 | Sepaniak et al. | |
| 2008/0289319 A1 | 11/2008 | Eisenberger et al. | |
| 2008/0289495 A1 | 11/2008 | Eisenberger et al. | |
| 2008/0289499 A1 | 11/2008 | Eisenberger et al. | |
| 2008/0289500 A1 | 11/2008 | Eisenberger et al. | |
| 2008/0314246 A1 | 12/2008 | Deckman | |
| 2009/0101050 A1 | 4/2009 | Lackner et al. | |
| 2009/0110907 A1 | 4/2009 | Jiang | |
| 2009/0232861 A1 | 9/2009 | Wright et al. | |
| 2009/0294366 A1 * | 12/2009 | Wright | B01D 53/02 210/683 |
| 2009/0320368 A1 | 12/2009 | Castaldi et al. | |
| 2010/0095842 A1 | 4/2010 | Lackner et al. | |
| 2010/0105126 A1 | 4/2010 | Wright et al. | |
| 2010/0116137 A1 | 5/2010 | Wright et al. | |
| 2010/0202937 A1 | 8/2010 | Lackner et al. | |
| 2010/0263534 A1 | 10/2010 | Chuang | |
| 2010/0300289 A1 | 12/2010 | Jiang | |
| 2011/0000371 A1 | 1/2011 | Eisenberger et al. | |
| 2011/0011945 A1 | 1/2011 | Eisenberger et al. | |
| 2011/0027143 A1 | 2/2011 | Wright et al. | |
| 2011/0027157 A1 | 2/2011 | Wright et al. | |
| 2011/0033357 A1 | 2/2011 | Wright et al. | |
| 2011/0033358 A1 | 2/2011 | Wright et al. | |
| 2011/0041688 A1 | 2/2011 | Eisenberger | |
| 2011/0056382 A1 | 3/2011 | Lackner et al. | |
| 2011/0079144 A1 | 4/2011 | Wright et al. | |
| 2011/0079146 A1 | 4/2011 | Wright et al. | |
| 2011/0079147 A1 | 4/2011 | Wright et al. | |
| 2011/0079149 A1 | 4/2011 | Wright et al. | |
| 2011/0079150 A1 | 4/2011 | Wright et al. | |
| 2011/0081709 A1 | 4/2011 | Wright et al. | |
| 2011/0081710 A1 | 4/2011 | Wright et al. | |
| 2011/0081712 A1 | 4/2011 | Wright et al. | |
| 2011/0083554 A1 | 4/2011 | Wright et al. | |
| 2011/0088550 A1 | 4/2011 | Tirio | |
| 2011/0108421 A1 | 5/2011 | Lackner et al. | |
| 2011/0146281 A1 | 6/2011 | Lackner et al. | |
| 2011/0185897 A1 | 8/2011 | Wright et al. | |
| 2011/0189075 A1 | 8/2011 | Wright et al. | |
| 2011/0203174 A1 | 8/2011 | Lackner | |
| 2011/0203311 A1 | 8/2011 | Wright et al. | |
| 2011/0206588 A1 | 8/2011 | Lackner | |
| 2011/0226006 A1 | 9/2011 | Lackner et al. | |
| 2011/0226697 A1 | 9/2011 | McLellan | |
| 2011/0268636 A1 | 11/2011 | Lackner et al. | |
| 2011/0293503 A1 | 12/2011 | Wright et al. | |
| 2011/0296872 A1 * | 12/2011 | Eisenberger | B01D 53/04 62/640 |
| 2012/0058032 A1 | 3/2012 | Lackner et al. | |
| 2012/0076711 A1 | 3/2012 | Gebald | |
| 2013/0312606 A1 | 11/2013 | Eisenberger | |
| 2013/0336722 A1 | 12/2013 | Wright et al. | |
| 2014/0026751 A1 | 1/2014 | Anand et al. | |
| 2015/0007725 A1 | 1/2015 | Elliot et al. | |

FOREIGN PATENT DOCUMENTS

| | | |
|---|---|---|
| EP | 20021180511 A2 | 2/2002 |
| EP | 20021234947 A2 | 8/2002 |
| EP | 2 160 234 A1 | 3/2010 |
| FR | 19842543946 A1 | 10/1984 |
| JP | 56-162813 | 12/1981 |
| JP | 58-074471 | 5/1983 |
| JP | 58 122022 A | 7/1983 |
| JP | 198459216839 | 12/1984 |
| JP | 03-245811 | 1/1991 |
| JP | 02-209678 | 8/1993 |
| JP | 05-209678 | 8/1993 |
| JP | 06-062677 | 3/1994 |
| JP | 06-346856 | 12/1994 |
| JP | 06-348189 | 12/1994 |
| JP | 07-051537 | 2/1995 |
| JP | 09-104419 | 4/1997 |
| JP | 11-244652 | 9/1999 |
| JP | 2001-068487 | 3/2001 |
| JP | 2001-300250 | 10/2001 |
| JP | 2003-326155 | 11/2003 |
| JP | 2004-282109 | 10/2004 |
| JP | 2006-061758 | 3/2006 |
| JP | 2006-075717 | 3/2006 |
| JP | 2008-122598 | 5/2008 |
| WO | WO1998029187 A1 | 7/1998 |
| WO | WO2005026694 A2 | 3/2005 |
| WO | WO2005037746 A1 | 4/2005 |
| WO | WO2005108297 A2 | 11/2005 |
| WO | WO2006009600 A2 | 1/2006 |
| WO | WO2006036396 A2 | 4/2006 |
| WO | WO2006/112977 | 10/2006 |
| WO | WO2008042919 | 4/2008 |
| WO | WO2008063082 A2 | 5/2008 |
| WO | WO2008144708 | 11/2008 |

OTHER PUBLICATIONS

English abstract, CN 1 303 910 A (Jul. 18, 2001) in U.S. Pat. No. 7,795,175.

English abstract, JP 2006-021989 A (Jan. 26, 2006) in U.S. Pat. No. 7,795,175.

(56) References Cited

OTHER PUBLICATIONS

Xu et al., "Preparations and characterization of novel CO2 'molecular basket' absorbents based on polymer-modified mesoporous molecular sieve MCM-41." Microporus and Mesoporus Materials 62: 29-45 (2003) as cited in U.S. Pat. No. 7,795,175.
International Search Report and Written Opinion of the International Search Authority, dated Dec. 18, 2007, from corresponding International application No. PCT/US2007/074615 in U.S. Pat. No. 7,795,175.
Hicks, Jason C. et al.; "Designing Adsorbents for CO2 Capture from Flue GAs-Hyperbranched Aminosilicas Capable of Capturing CO2 Reversibly"; Feb. 2008; J. Amer. Chem. Soc., vol. 130, pp. 2902-2903.
Gold, Blanchard; "Integrated Gasification Combined Cycle IGCC"; www.globalgreenhousewarming.com.
Leal, Orlando; "Reversible adsorption of carbon dioxide on amine surface-bonded silica gel"; 1995; Elsevier Science S.A., Inorganica Chimica Acta 240, pp. 183-189.
Dubey, "Science for sustainability: From capturing carbon dioxide from air to environmental impact of a hydrogen economy," Apr. 2, 2003, pp. 1 and 2.
Vaartstra, Brian A., et al., "Advances in Precursor Development for CVD of Barium-Containing Materials." Mat. Res. Soc. Symp. Proc. vol. 335, pp. 203-208, 1994 Materials Research Society.
Park, Jung Woo, et al., "Strontium B-diketonate complexes with polyamine donor ligands: the synthesis and structural characterization of [Sr(thd)2(L)]n (n=2; L=diethylenetriamine, n+1; L=triethylenetetramine, tetraethylenepentamine and tris(2-aminoethyl)amine) complex." Polyhedron 19 (2000) 2547-2555.

\* cited by examiner

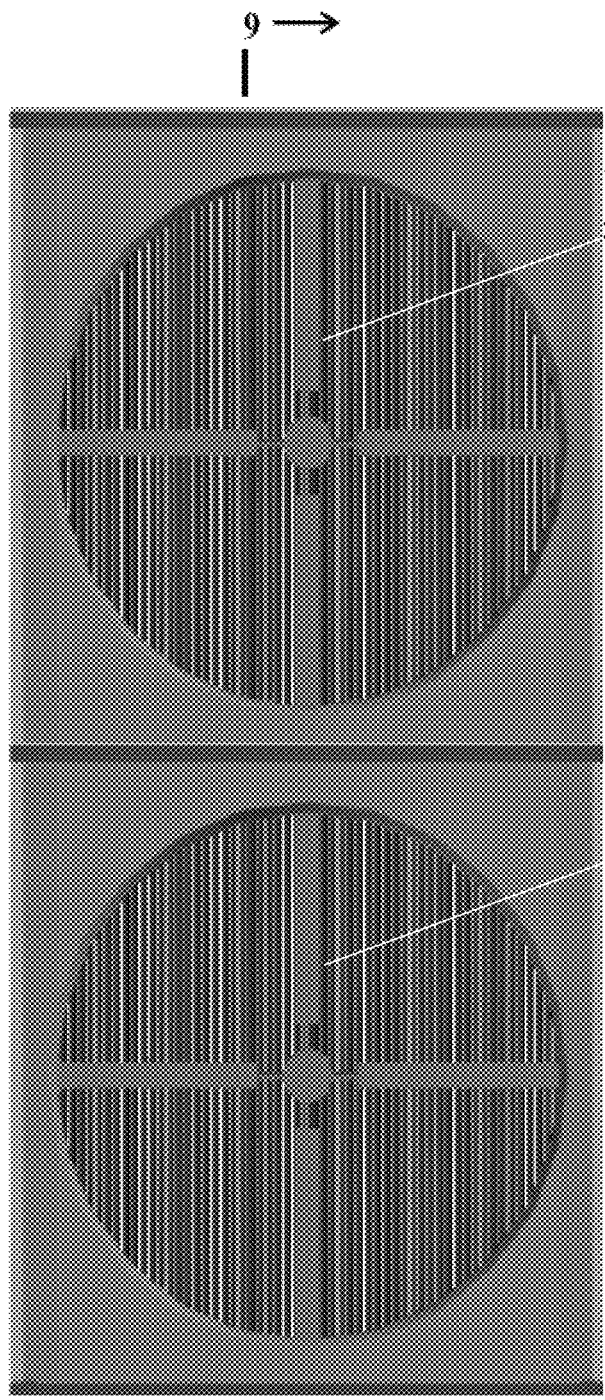
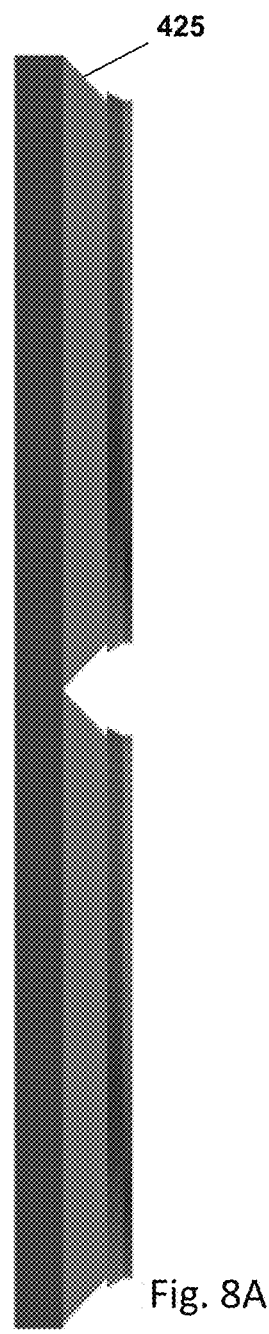
Fig. 8B
Fig. 8A

ROTATING MULTI-MONOLITH BED MOVEMENT SYSTEM FOR REMOVING $CO_2$ FROM THE ATMOSPHERE

This application claims the benefit of priority pursuant to 35 U.S.C. 119(e) from a U.S. Provisional Patent Application having Application No. 61/922,338 filed Dec. 31, 2013, the text of which is fully incorporated by reference herein as if repeated below.

BACKGROUND

The present invention relates to systems and methods for removing greenhouse gases from the atmosphere, and in particular to systems and methods for removing carbon dioxide from a stream of gas, including ambient air.

As a further improvement to the system described in copending U.S. application Ser. No. 13/098,370, filed on Apr. 29, 2011, a suitable system and process is presented that it is now recognized can be utilized for a broader range of use than disclosed in that earlier application, especially when further modified. The disclosure of that copending application is incorporated by reference herein as if repeated in full, as modified by the new disclosure presented herein.

There is much attention currently focused on trying to achieve three somewhat conflicting energy related objectives: 1) provide affordable energy for economic development; 2) achieve energy security; and 3) avoid the destructive climate change caused by global warming. However, there is no feasible way to avoid using fossil fuels during the rest of this century if we are to have the energy needed for economic prosperity and avoid energy shortfalls that could lead to conflict.

It is mostly undisputed by scientists that an increase in the amount of so-called greenhouse gases like carbon dioxide (methane and water vapor are the other major greenhouse gases) will increase the average temperature of the planet.

It is also clear that there is no solution that only reduces the ongoing human contributions to carbon dioxide emissions that can successfully remove the risk of climate change. Removing additional $CO_2$ from the atmosphere is also necessary. With air extraction and the capability to increase or decrease the amount of carbon dioxide in the atmosphere, one can in principle compensate for other greenhouse gases like methane (both naturally occurring and from human activity) that can increase their concentrations and cause climate change.

Until the recent inventions by the present applicant, it was the generally accepted belief among experts in the field that it was not economically feasible to capture carbon dioxide directly from the atmosphere because of the low concentration of that compound, in order to at least slow down the increase of so-called 'greenhouse' gases in the atmosphere. It was subsequently shown by the copending, commonly owned, prior applications that it was in fact practical and efficient to carry out such $CO_2$ reductions under specified conditions.

It was shown that under ambient conditions $CO_2$ can be efficiently extracted from the air, at ambient conditions, using a suitable regenerable sorbent system and a low temperature stripping or regeneration process, and that such a process can be expanded to remove $CO_2$ from mixtures of effluent gases mixed with a major amount of ambient air, so as to not only remove the $CO_2$ from flue gas but to remove additional $CO_2$ from the atmosphere so as to achieve a net reduction in $CO_2$ in the atmosphere at lower cost and higher efficiency.

SUMMARY OF THE PRESENT INVENTION

The present invention provides further new and useful systems and methods for removing carbon dioxide from a mass of carbon dioxide laden air, at higher efficiencies and lower overall costs including lower capital expenses ("CAPEX") and tower operating expenses ("OPEX").

In accordance with the present invention, a novel process and system has been developed utilizing assemblies of a plurality of monoliths, or beds, that are combined with a single regeneration box, in a ratio dependent upon the ratio of the speed of adsorption compared to the speed of regeneration of the sorbent. In preferred embodiments, the monoliths are supported on a closed loop track, preferably forming a closed curve; upon which the monoliths are rotated along the track, in succession, white being exposed to a moving stream of ambient air or a mixture of gases comprising a major proportion of ambient air. At one location along the track, the rotation is halted and one of the monoliths is moved into a sealed box for processing to strip $CO_2$ from the sorbent to regenerate the sorbent. When the sorbent is regenerated, the monoliths are rotated around the track until the next monolith is in position to enter the regeneration box, when the rotation of all of the monoliths is next halted.

Each monolith is formed of a porous substrate having on its surfaces carbon dioxide adsorbing amine sites, preferably with a high proportion of primary amines. As the monoliths move along the track, they adsorb $CO_2$ from the moving gas streams until each monolith reaches the sealed box. Once sealed within the box, the sorbent is treated to cause the $CO_2$ to be stripped from the sorbent, regenerating the sorbent. The stripped $CO_2$ is removed from the box and captured. The monolith with the regenerated sorbent then moves out of the sealed box and moves along the track with the other monolith to adsorb more $CO_2$, until the next monolith is rotated into position to be moved into the regeneration box. At the stripping/regeneration location, the monolith can be moved into a box located above or below the grade of the track, or the box can be located so that the monolith moves into the box at the same grade level as the track, forming a seal with the monolith. These several alternatives are further defined below and diagrammed in the accompanying drawings.

In the instances where the regeneration box is below or above grade, the system must include a sub-system for raising or lowering the monolith. In systems where the regeneration box is on grade with the tracks, a more complex sealing arrangement will be required, for providing a seal along the sides as well as along the top and/or bottom surfaces.

$CO_2$ Adsorption and Removal Process

The basic premise of this process is that $CO_2$ is adsorbed from the atmosphere by passing air or a mixture of air and effluent gas, through a sorbent bed, preferably at or close to ambient conditions. Once the $CO_2$ has been adsorbed b the sorbent, the $CO_2$ has to be collected, and the sorbent regenerated. The latter step is performed by heating the sorbent with steam in the sealed containment box to release the $CO_2$ and regenerate the sorbent. The $CO_2$ is collected from the box, and the sorbent is then available to re-adsorb $CO_2$ from the atmosphere. The only primary limitation on the process is that the sorbent can be de-activated if exposed to air if it is at a "too high" temperature. Thus the sorbent may have to be cooled before the monolith leaves the box and is returned to the air stream.

Generally, a longer time is required for adsorption of $CO_2$ from ambient air than for the release of the $CO_2$ in the regeneration step. With the current generation of sorbent this difference will require an adsorption period approximately ten times greater for the adsorption step compared with that required for $CO_2$ release and sorbent regeneration, when treating ambient air. Thus a system with ten monoliths and a single regeneration unit has been adopted as the current basis for an individual rotating system. If the performance of the sorbent is improved over time, this ratio of adsorption time to desorption time, and thus the number of monoliths, required in a system, should be reduced. In particular, if a higher loading embodiment of the sorbent is used a one hour adsorption time would be viable, thus requiring one regeneration box to serve only five monoliths. In addition the relative treatment times will vary with the concentration of $CO_2$ in the gas mixture treated, such that the higher the $CO_2$ content, the shorter the adsorption time relative to the regeneration time, e.g., by mixing a combustion effluent ("flue gas") with the ambient air through a gas mixer.

The chemical and physical activity within the monoliths, both during the adsorption cycle and the regeneration cycle in the sealed box, is substantially the same as is described in prior copending applications Ser. Nos. 13/886,207 and 13/925,679. The disclosures of those copending applications are incorporated by reference herein as if repeated in fill, as modified by the new disclosure presented herein. In the system according to the present invention, each rotating system provides one sealable regeneration box for each group of rotating monoliths, the number of monoliths being dependent upon the relative times to achieve the desired adsorption and the desired regeneration. In addition, it has been found that greater efficiencies and lower costs are achieved by spatially relating and temporally operating two of the rotating systems in a suitable relationship to allow the regeneration boxes for the two rotating monolith systems to interact, such that each is preheated by the remaining heat in the other as a result of regeneration in the other; this also efficiently cools down the regenerated monolith before it is returned to its adsorption cycle on the rotating track.

This interaction between the regeneration boxes is achieved in accordance with this invention, by lowering the pressure of the first box system so that the steam and water remaining in the first box evaporate after the release of $CO_2$, and the system cools to the saturation temperature of the steam at its lowered partial pressure. Furthermore, as described below, the heat released in this process is used to pre-heat the second sorbent bed and thus provides approximately 50% sensible heat recovery, with a beneficial impact on energy and water use. This concept can be used even if an oxygen resistant sorbent is utilized. The sensitivity of the sorbent to oxygen de-activation at higher temperatures is being addressed during the development process and it is anticipate(that its performance will be improved over time.

As discussed above, the sorbent bed is preferably cooled before it is exposed to air so as to avoid de-activation by the oxygen in the air. This cooling is achieved by towering the system pressure and thus lowering the steam saturation temperature. This has been shown to be effective in eliminating the sorbent deactivation issue as it lowers the temperature of the system. There is thus a significant amount of energy removed from the bed that is cooled during the de-pressurization step. A fresh bed that has finished its $CO_2$ adsorption step has to be heated to release the $CO_2$ and regenerate the sorbent. This heat could be provided solely by the atmospheric pressure steam, but this is an additional operating cost. In order to minimize this operating cost, a two-bed design concept has been developed. In this concept the heat that is removed from the box that is being cooled by reducing the system pressure, and thus the steam saturation temperature, is used to partially pre-heat a second box containing a bed that has finished adsorbing $CO_2$ from the air and which is to be heated to start the $CO_2$ removal and sorbent regeneration step. Thus the steam usage is reduced by using heat from the cooling of the first box to increase the temperature of the second box. The remaining heat duty for the second box is achieved by adding steam, preferably at atmospheric pressure. This process is repeated for the other rotating monoliths in each of the two boxes and improves the thermal efficiency of the system.

These and other features of this invention are described in or are apparent from, the following detailed description, and the accompanying drawings.

BRIEF DESCRIPTION OF THE FIGURES AND EXHIBITS

Figure 6:
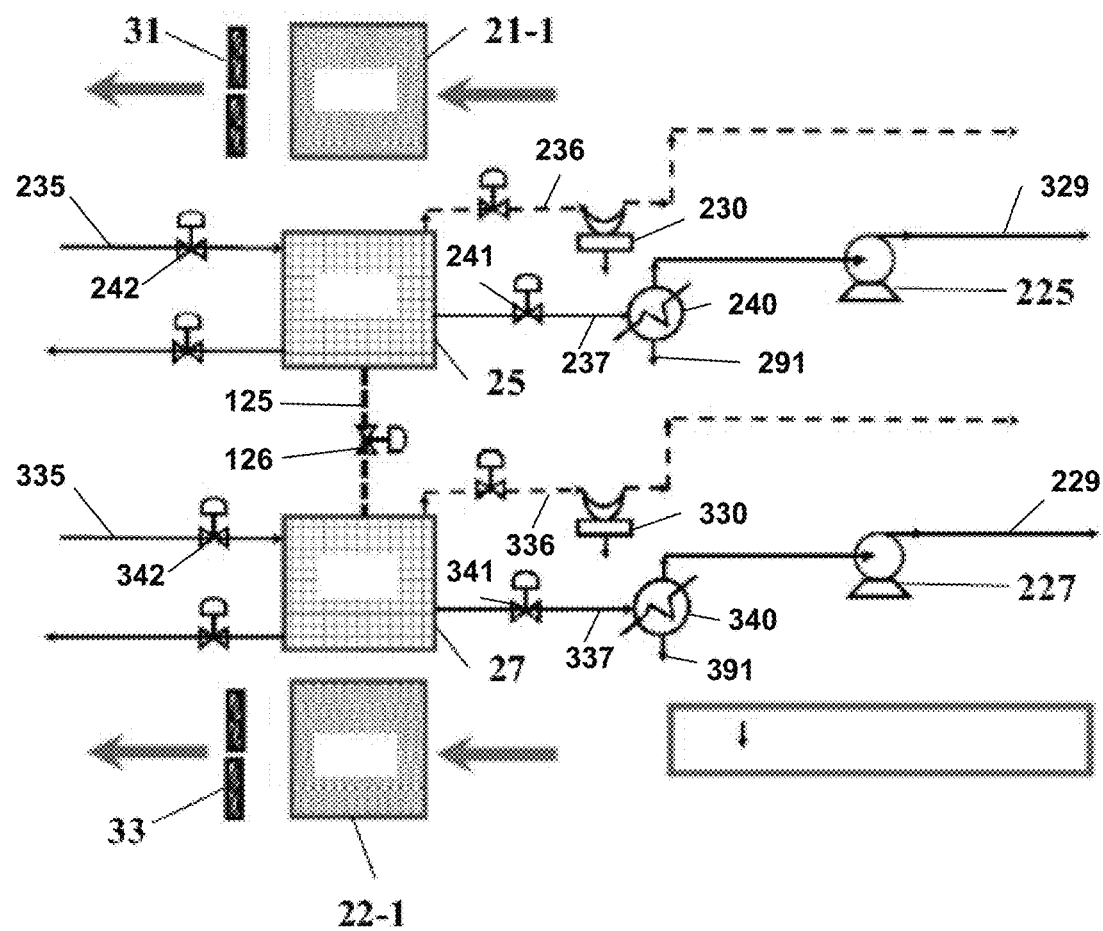
Figure 7A:
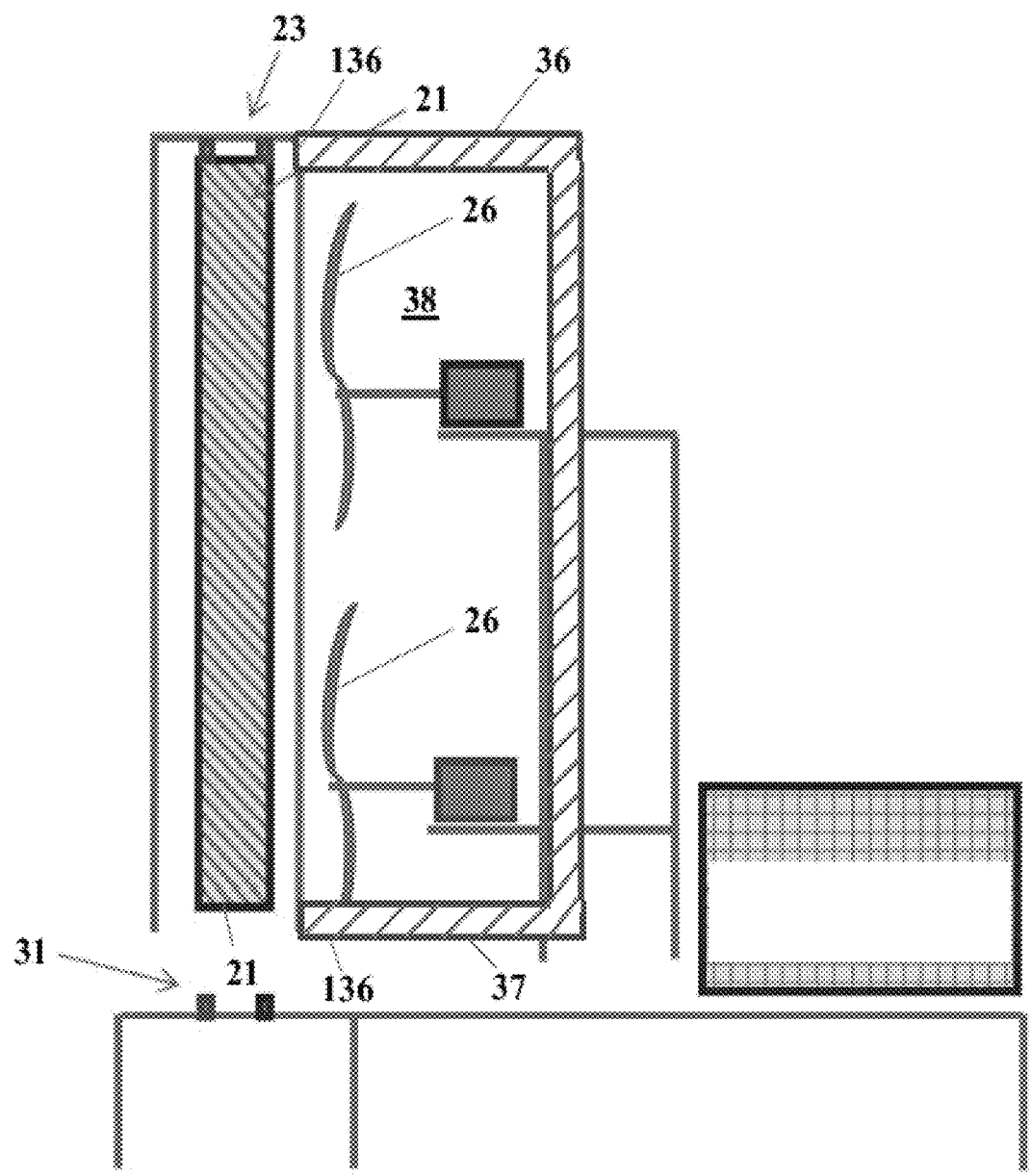
Figure 9:
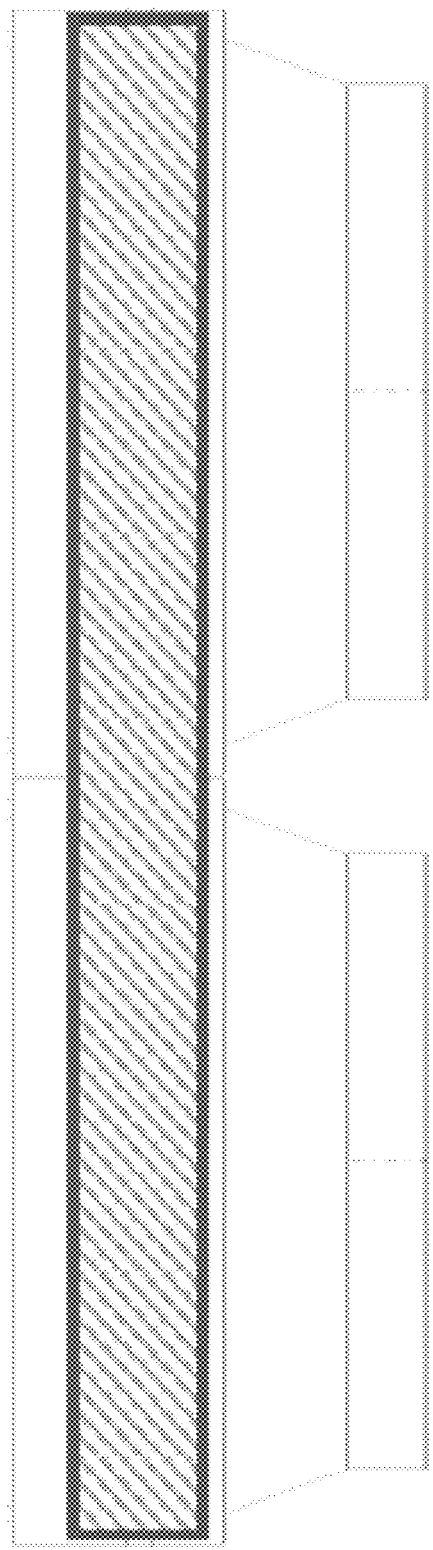
Figures 10A, 10B, 10C:
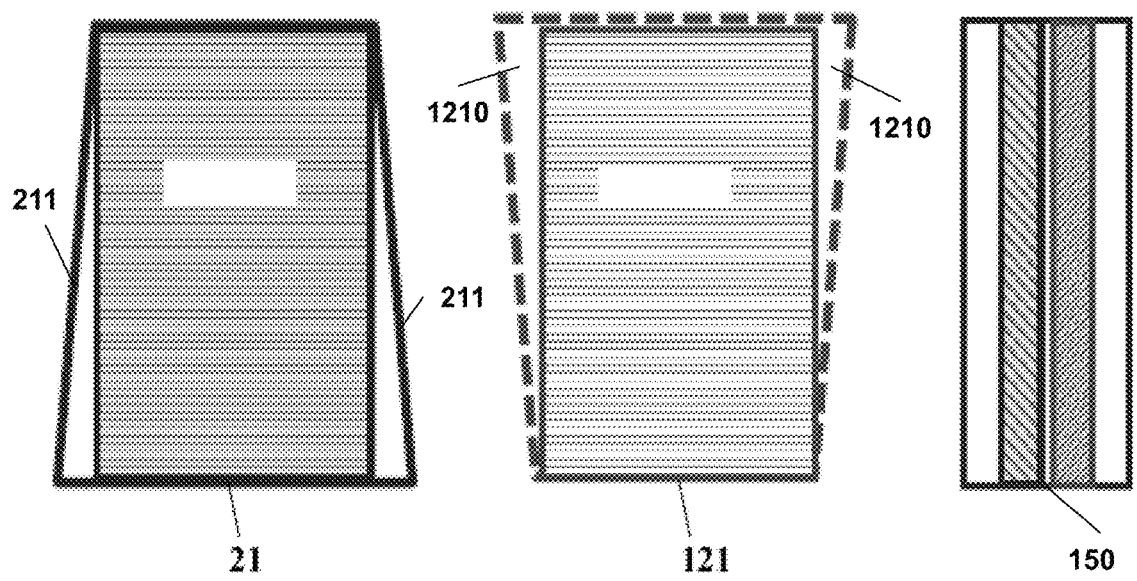
Figure 11:
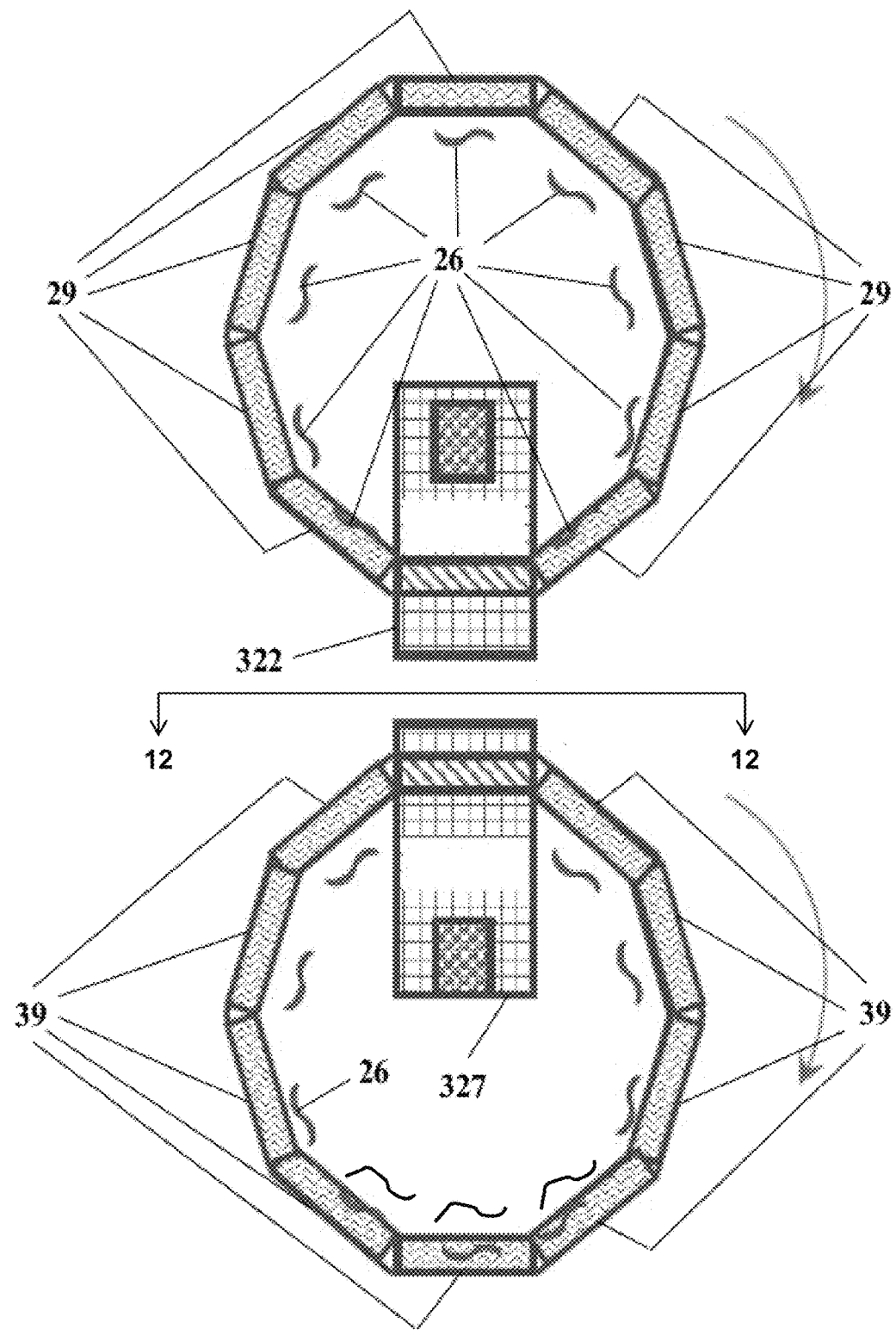
Figure 12:
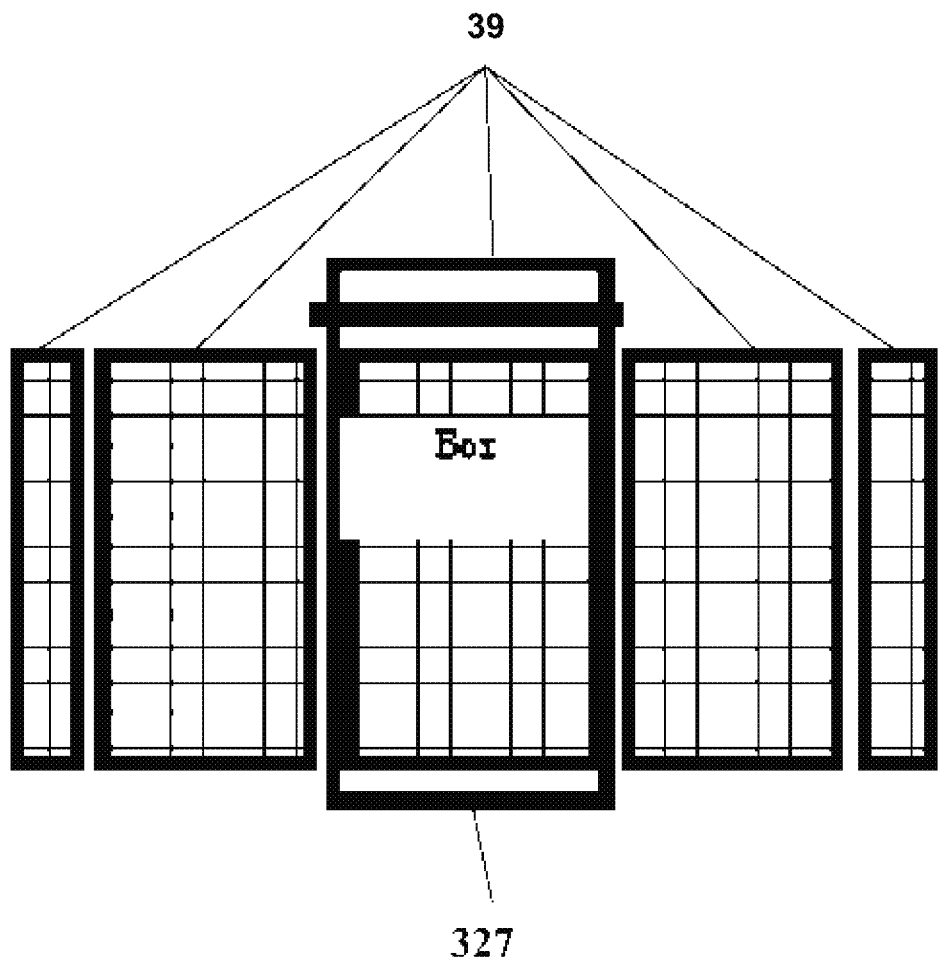

FIGS. 5 and 5A-H are schematic illustrations of a vertical offset version of a pair of regenerating chambers for removing carbon dioxide from the monolith medium of FIGS. 1 through 4, utilizing a vertical motion system or elevator to move the monolith between the rotating track level, upper air contact position (where the air movement is aided by a mechanical blower) and the vertically offset regeneration chamber position;

FIG. 6 is a top plan [schematic elevation] view of the regeneration chambers and monoliths on adjacent monolith systems showing, the piping system arrangement for each chamber and between the chambers;

FIGS. 7A and B are schematic elevation views showing fans which are stationary and which rotate with each monolith, respectively;

FIG. 8A is a diagrammatic side elevation view of a Design for Dual Induced Axial Fans and Plenums of FIGS. 7A, B;

FIG. 8B is a diagrammatic front elevation view of a Design for Dual Induced Axial Fans and Plenums of FIGS. 7A, B;

FIG. 9 is a diagrammatic cut-away elevation view of the Design for Dual induced Axial Fans and Plenums of FIG. 8B, along lines 9-9;

FIGS. 10A, 10B and 10C depict the Design of Seal Systems on the monoliths, depending on the location of the regeneration position, where the Angles and Dimensions are Exaggerated for Explanation Purposes;

FIG. 11 is a diagrammatic top view of a mutually interactive pair of rotating multi-monolith systems for removing carbon dioxide from the atmosphere according to another exemplary embodiment of this invention; and FIG. 12 is a diagrammatic elevation view of the mutually interactive pair of rotating multi-monolith system, taken along lines 11-11 of FIG. 11, for removing carbon dioxide from the atmosphere.

DETAILED DESCRIPTION OF INVENTION

Figure 1:
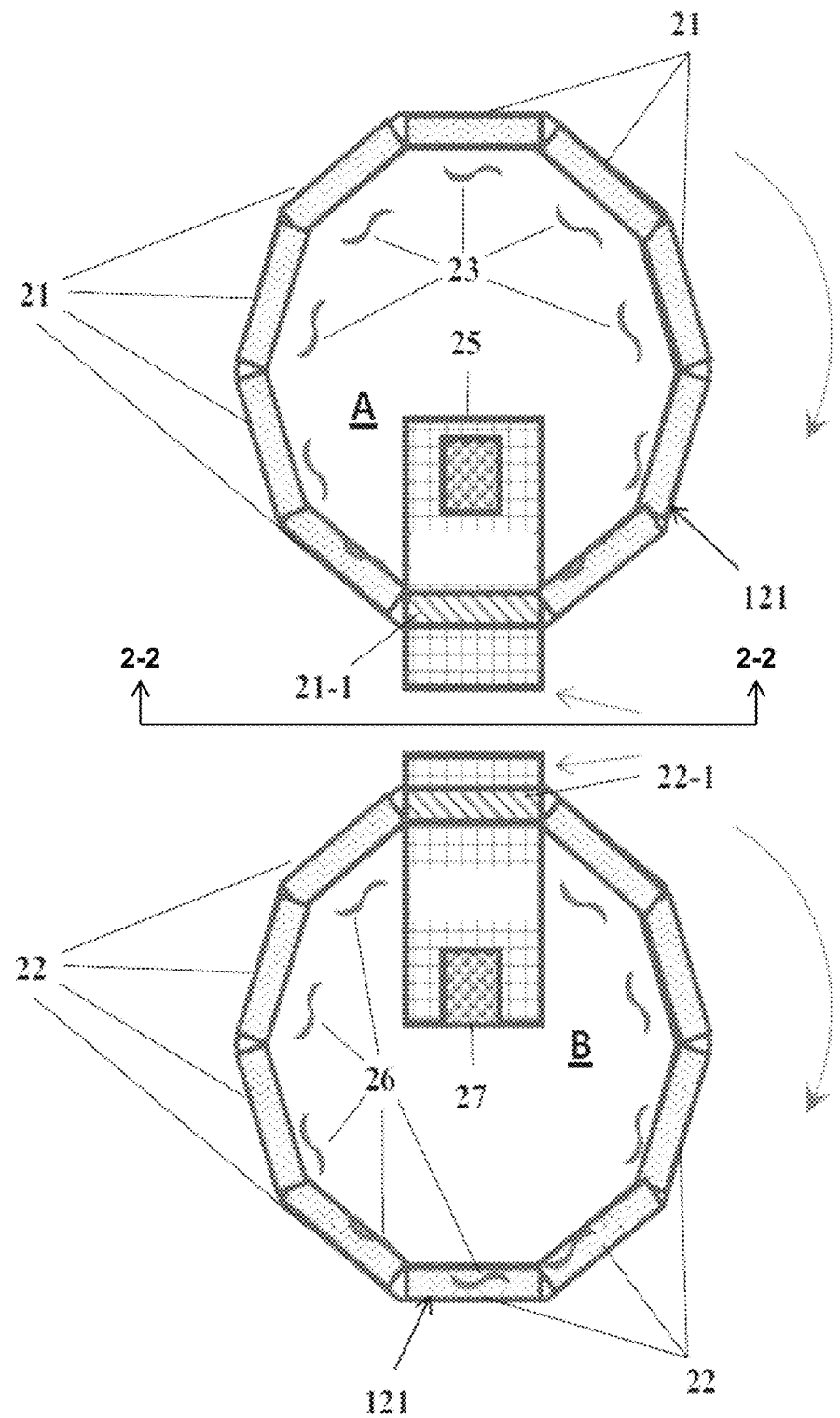
FIG. 1 is a diagrammatic top view of a mutually interactive pair of rotating multi-monolith systems for removing carbon dioxide from the atmosphere according to an exemplary embodiment of this invention.
Figure 2:
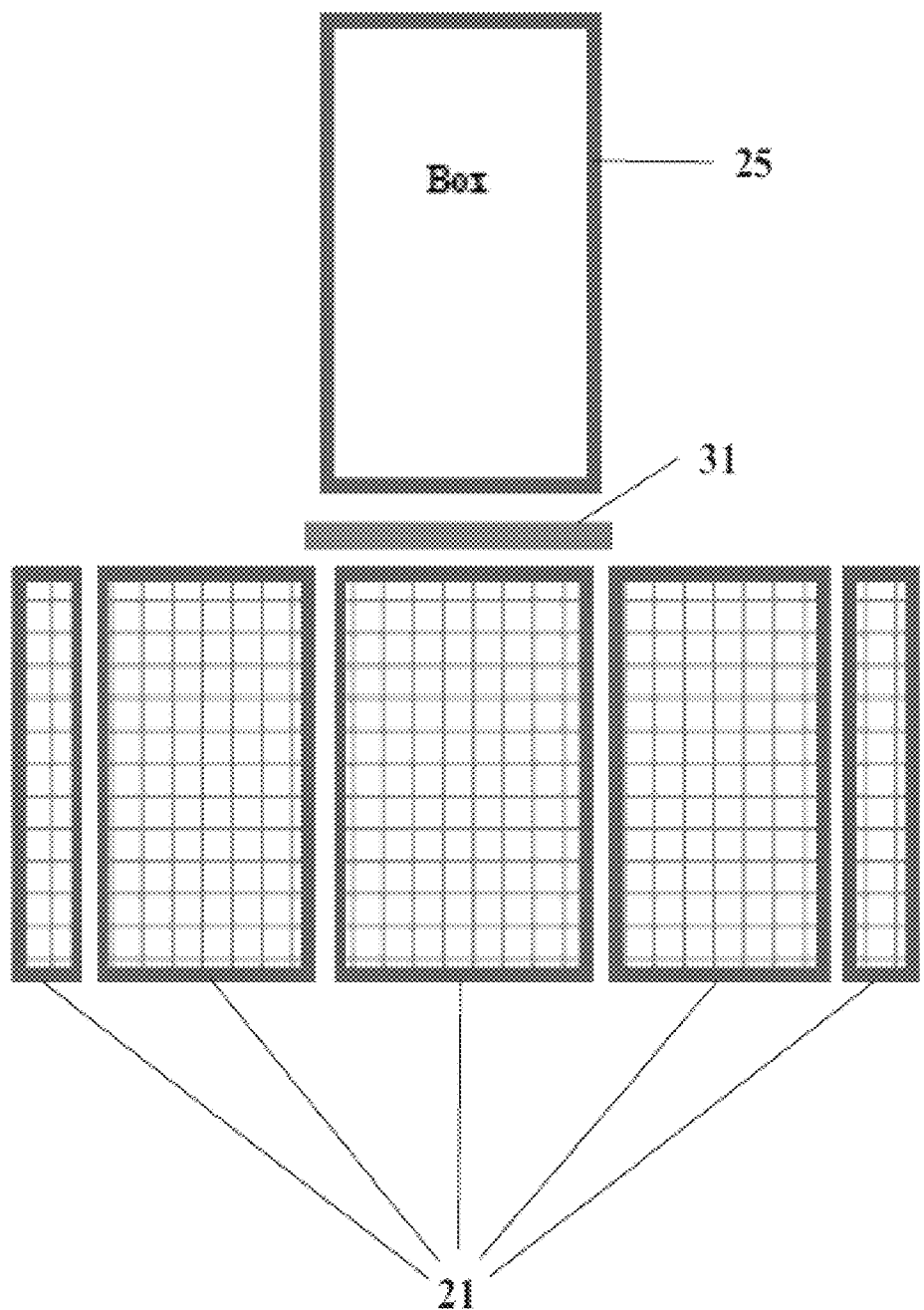
FIG. 2 is a diagrammatic elevation view of the rotating multi-monolith system of FIG. 1 for removing carbon dioxide from the atmosphere according to an exemplary embodiment of this invention.
Figure 3:
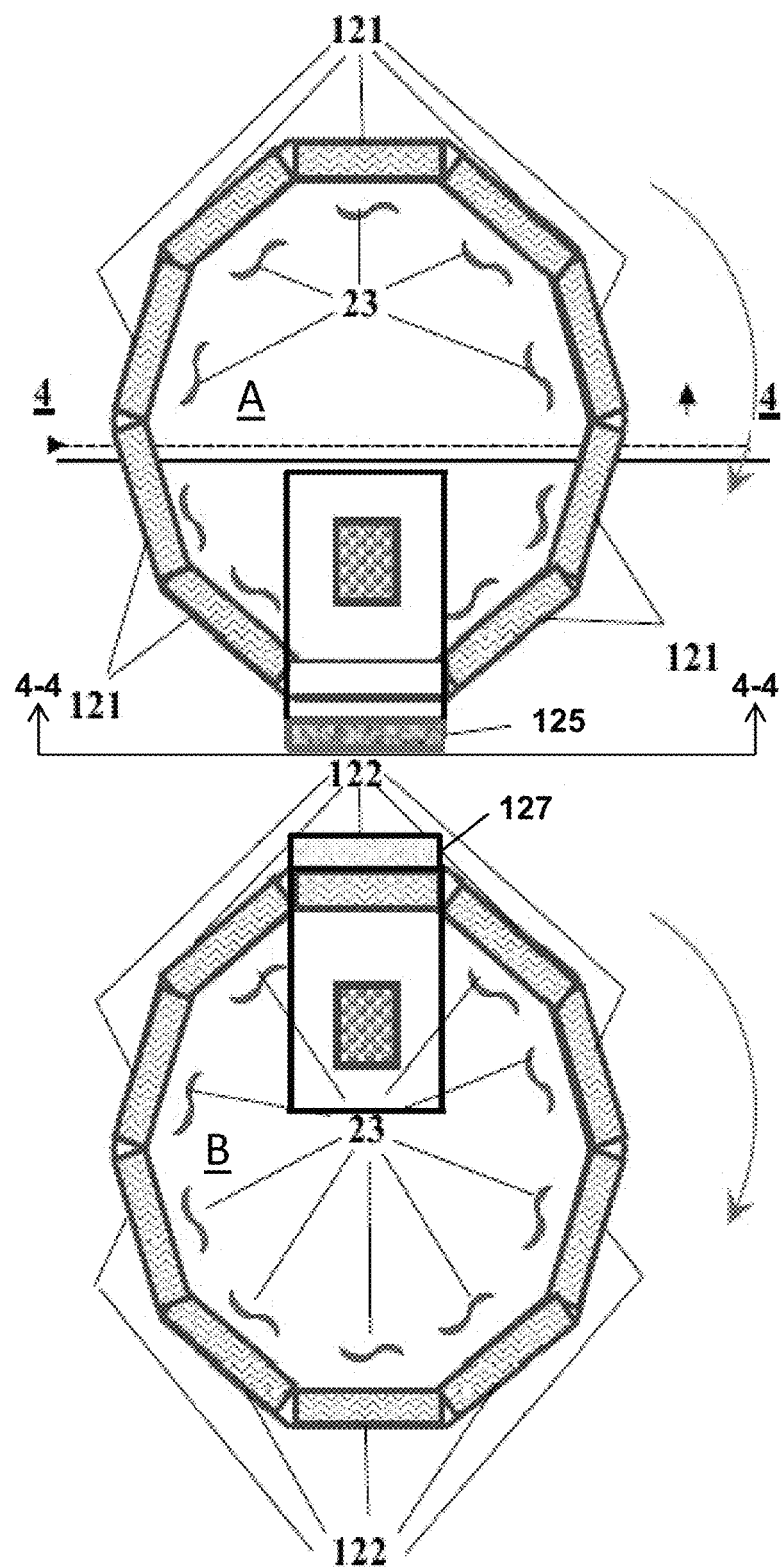
FIG. 3 is a diagrammatic top view of an alternative mutually interactive pair of rotating multi-monolith systems for removing carbon dioxide from the atmosphere according to another exemplary embodiment of this invention.
Figure 4:
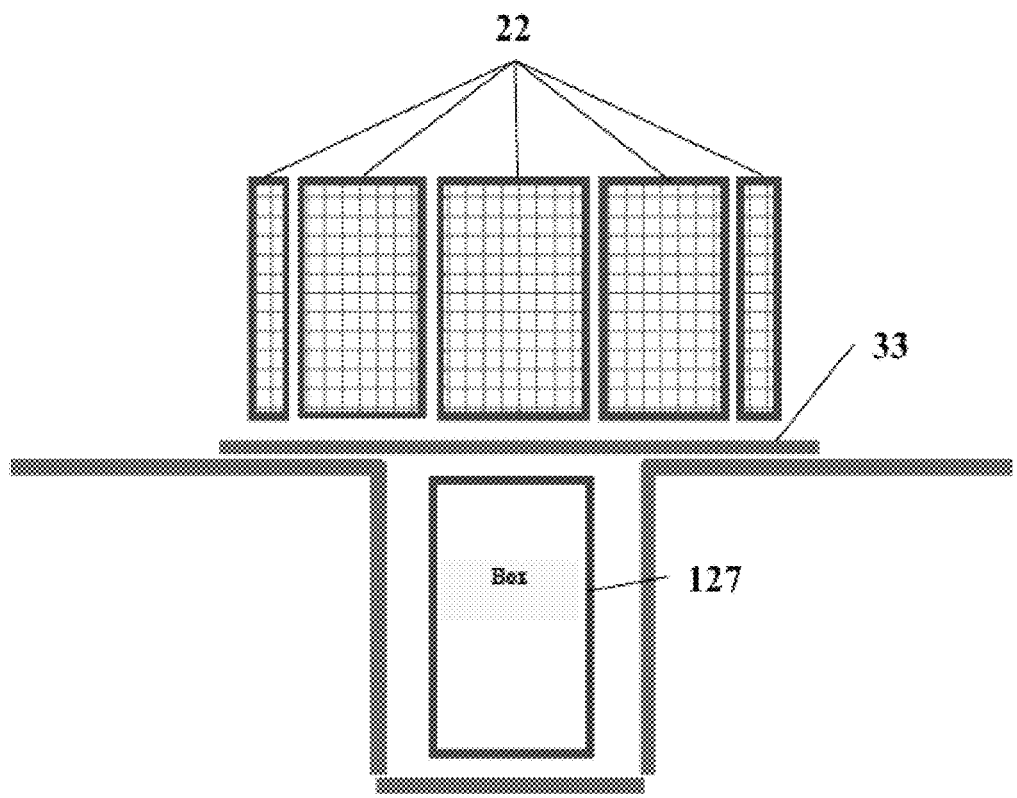
FIG. 4 is a diagrammatic elevation view of the rotating multi-monolith system of FIG. 3 for removing carbon dioxide from the atmosphere according to that exemplary embodiment of this invention.

A conceptual design for a system to perform these operations is shown in FIGS. 1 and 2. A slight variation on the concept is shown in FIGS. 3 and 4. The overall conceptual design is discussed above, and a detailed discussion of the operation and the ancillary equipment that will be required is set out below.

In this embodiment, there are ten "monoliths" located in a decagon arrangement and which are located on a circular track. There are two circular/decagon assemblies associated with each process unit and they interact with each other (see FIGS. 1-4). Air is passed through the monoliths by induced draft fans located on the inner sides of the monoliths. At one location the monoliths are in a position adjacent to a single sealable chamber box, into which each monolith is inserted, as shown by vertically moving the bed out from the track, for processing (i.e. where they are heated to a temperature of not greater than 130 C., and more preferably not above 120 C., preferably with precise heat steam to release the $CO_2$ from the sorbent and regenerate the sorbent). Alternatively, the box can be on grade. In this embodiment, the adsorption time for adsorbing $CO_2$ by the monolith is ten times as long as sorbent regeneration time.

It should be understood that although the use of porous monoliths is preferred, it is feasible to use stationary beds of porous particulate, or granular, material supported within a frame, in place of the monolith. In both cases the porous substrate supports an amine sorbent for $CO_2$, when the bed has the same surface area as the monolith for supporting the adsorbent.

Mechanical Requirments

FIGS. 1-4, 11 and 12 show the basic operational concepts of the system. There are ten "monoliths" 21, 22 located in each decagon assembly arrangement and which are movably supported on a circular track 31, 33. There are two circular/decagon assemblies A, B associated with each process unit and they interact with each other. Air is passed through each of the monoliths 21, 22 by induced draft fans 23, 26, located radially interiorly of each of the decagon assemblies, and inducing a flow of air out of the inner circumferential surface of each monolith, and up away from the system. At one location along the track 31, 33, the monoliths 21, 22 are adjacent to a sealable regeneration box 25, 27 into which the monoliths 22, 22 are inserted for regeneration processing after having completed one rotation around the track.

Thus, as shown in FIGS. 1 and 2, a first Bed 21 is rotated into position beneath the regeneration box 25 and then moved vertically upwardly into the box 25 for processing; or if the box 27 is located below grade, FIG. 4, the Beal 22, is then moved vertically downwardly into the box 127 for processing; or if on grade, assembly is rotated to move the Bed 21, 22 out of the box 27, so that Bed 21, 22 is in position when movement along the track is halted for all of the monoliths. When the Bed 21 has been regenerated it is moved back onto the track and the bed assembly is rotated, an that the next Bed 21-2, 22-2 is in position. Bed 2 is then moved into the box for processing and then returned to the ring. This process is repeated continually. The two ring assemblies operate together, although the monoliths for each decagon are moved in and out of their boxes at slightly different times, as explained below, to allow for the passage of heat, e.g., between Box 25 and Box 27, when regeneration in one is completed to provide for preheating of the other box. This saves heat at the beginning of the regeneration and reduces cost of cooling the bed after regeneration.

Three locations for the regeneration boxes 25, 27 are presented. In FIGS. 1 and 2, the regeneration boxes 25, 27 are placed above the rotating bed assemblies (at nominal grade) and the monoliths are moved vertically up into the boxes for regeneration. The only elevated structure is that required for the boxes, which are located above the rotating monoliths on a cantilevered structure.

In FIGS. 3 and 4 the boxes 125, 127 are located below grade and under the rotating bed assemblies. The boxes would be located in a single excavation with adequate access for maintenance and process piping. The beds are moved vertically downwardly into the boxes.

In FIGS. 11 and 12 the regeneration boxes 321, 327 are located on grade with the rotating bed assemblies. The boxes would be located with adequate access for maintenance and process piping also on grade. Suitable mutually sealing surfaces would be located on the box and on each bed, so that as the bed rotates into position in the box, the box 322, 327 is sealed.

In all cases ancillary equipment (such as pumps, control systems, etc.) would preferably be located at grade within the circumference of the track supporting the rotating bed assemblies 29, 39. The regeneration boxes could be located in different levels, in particular situations without departing from the concept of this invention.

These designs, compared to prior disclosed apparatus in the prior art, would:

Minimize structural steel;
Place all major equipment at grade level apart from the regeneration boxes which are only acting as containment vessels;
Ensure that there is no interference with air flow to the monoliths, where the boxes are at different levels from the track;
Only require one or no vertical movement equipment for the monoliths, for insertion into the single box for each group of, e.g., 10, monoliths;
Minimize or eliminate the time required for bed movements in and out of box, especially when the boxes are on grade;
Allow all piping to be in fixed positions; and
Allow the two regeneration boxes to be adjacent to each other with minimum clearance to permit the heat exchange desirable for increased efficiency.

The mechanical operations, with necessary machinery and power, that are required include:

Rotation of the two sets of bed assemblies around a circular track on a support structure
Precise locating elements to precisely locate the position where the monoliths are to be stopped so as to ensure the free movement of the monoliths into and out of the regeneration box
Removal of the bed from the bed assembly on the track, insertion of the bed into the regeneration box, removal of the bed from the regeneration box and re-insertion of the bed into its position on the track assembly. All of these movements occurring in a vertical direction, or alternatively as part of the horizontal rotational movement on the track. The monoliths and regeneration boxes are designed no that, for vertically movable monoliths there is an air-tight seal between the top or bottom of each monolith and the support structure of the box. Examples of some conceptual designs for such seals are shown in FIG. 10.

Figure 5:
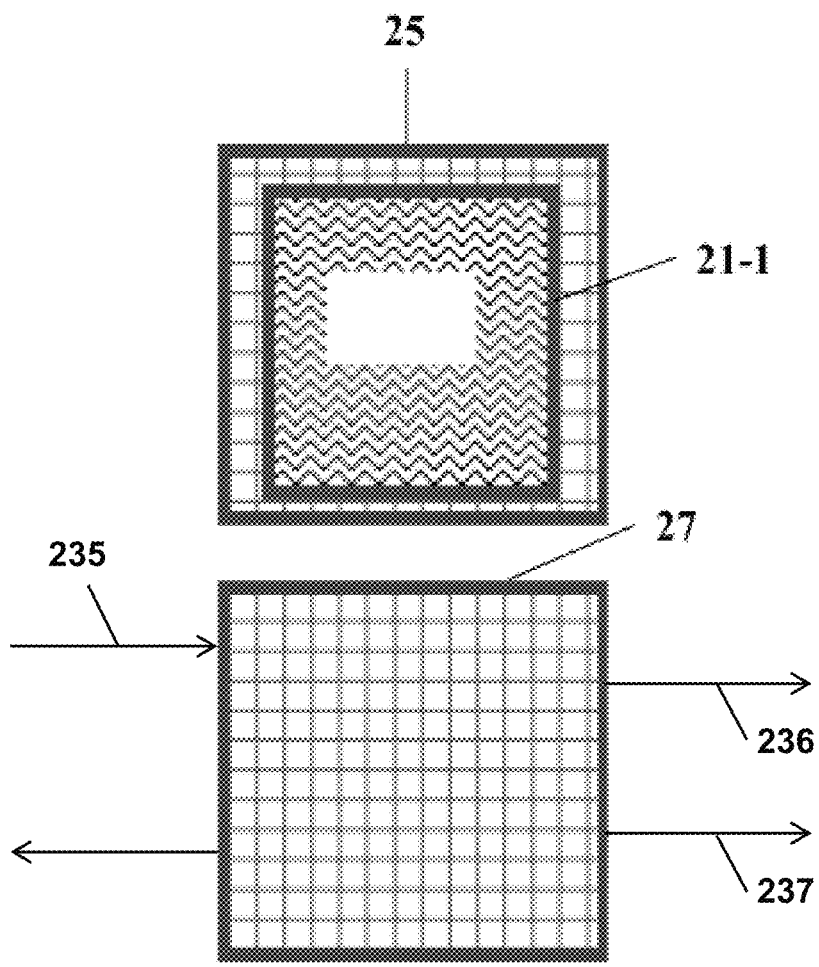
Figure 5A:
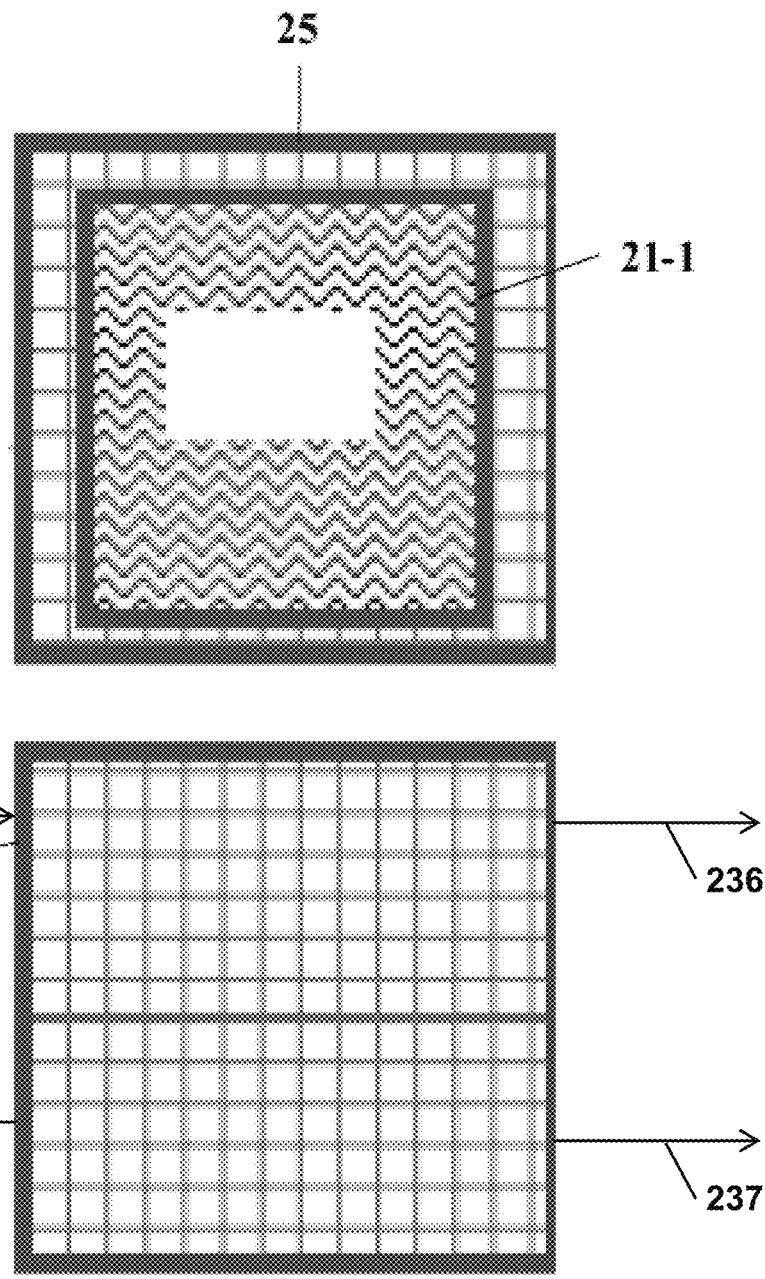
Figure 5B:
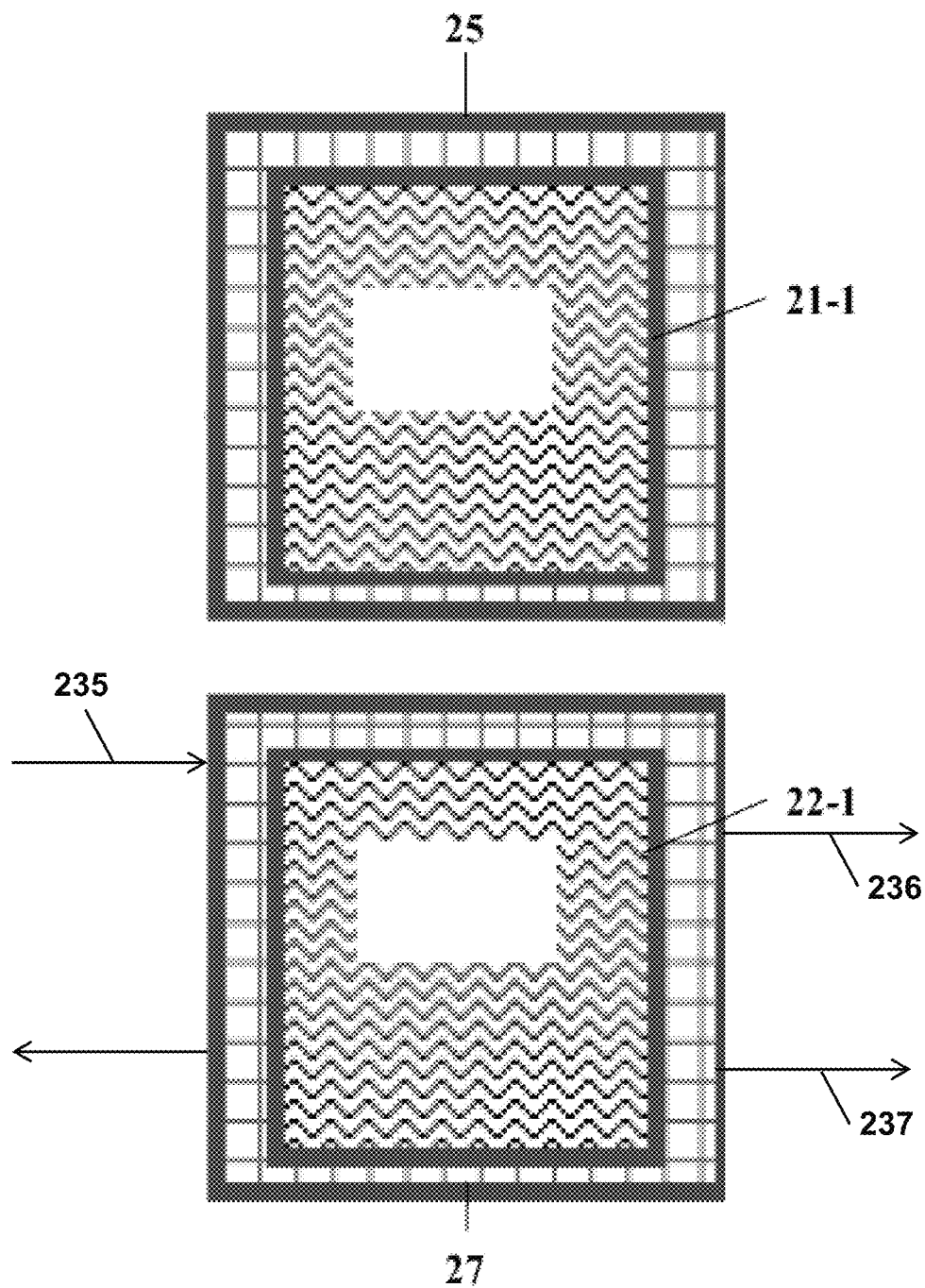
Figure 5C:
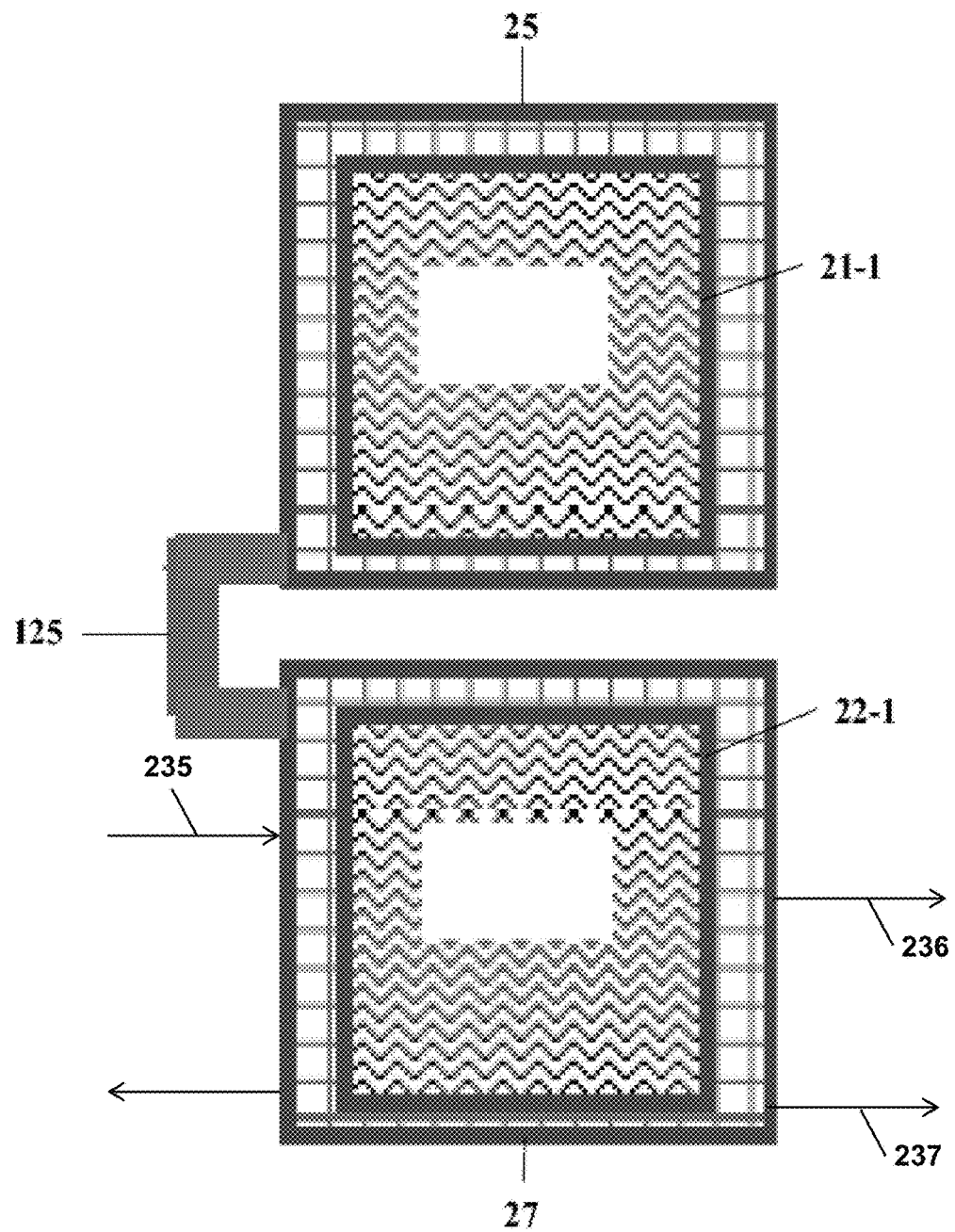

In all cases, referring to FIGS. 1-6, a Bed 21-1 (Ring A) is rotated into position and then moved up or downwardly into the Box 25 for processing. The pressure in Box 25 (containing Bed 21-1, Ring A) is reduced using, e.g., a vacuum pump 230, to less than 0.2 BarA. The Box 25 is heated with steam at atmospheric pressure through line 235 and $CO_2$ is generated from Bed 21-1 and removed through the outlet piping 237 from the Box 25 for the $CO_2$ and condensate which is separated on a condenser 240 FIG. 5A). Bed 22-1 (Ring B) is then placed in Box 27 (Ring B) white Box 25 is being processed, as above (FIG. 5B). The steam supply to Box 25 is stopped and the outlet piping for the $CO_2$ and condensate isolated. Box 25 and Box 27 are connected by opening valve 126 in connecting piping 125 (FIG. 5C).

Figure 5D:
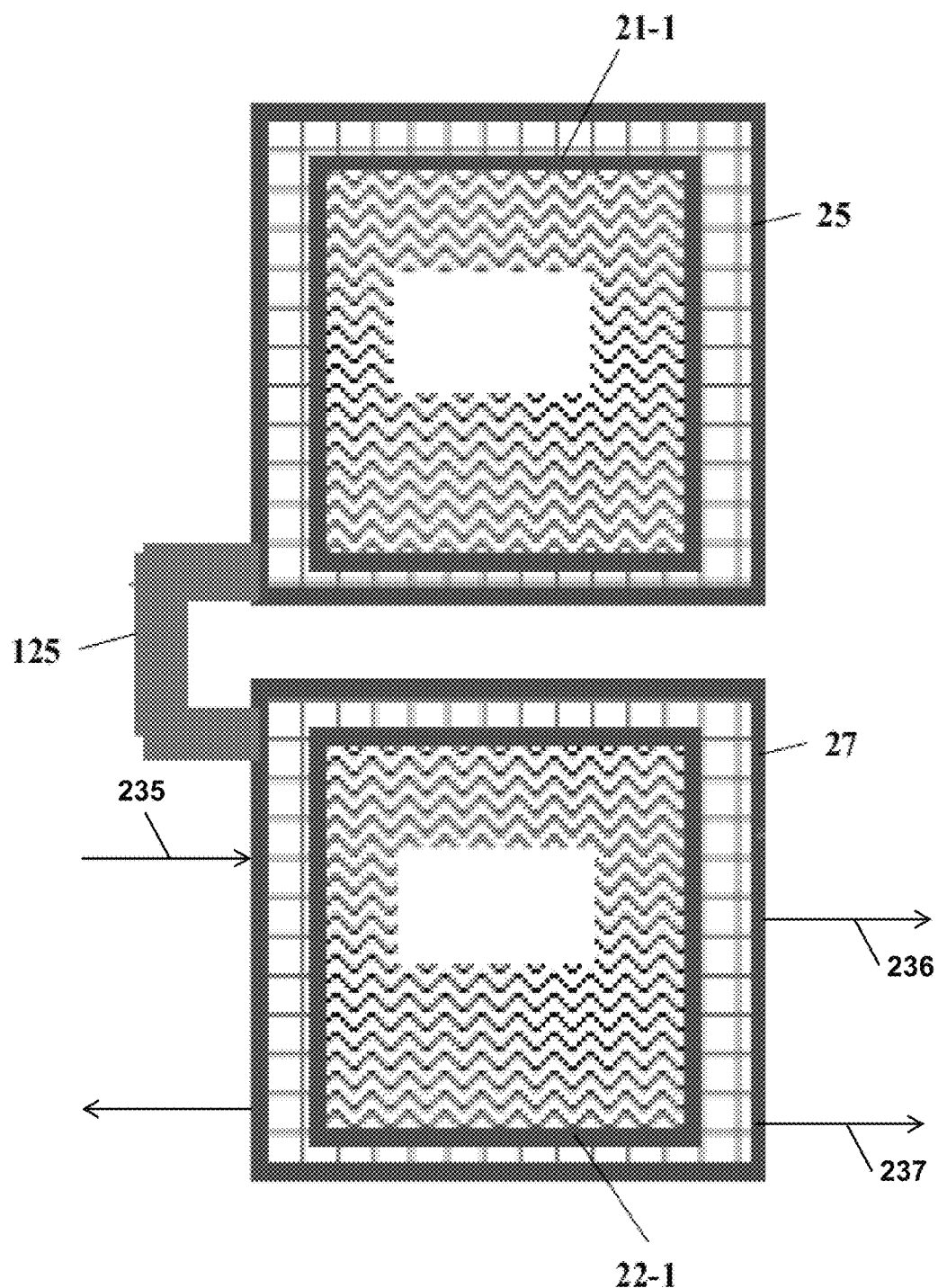

The pressure in Box 27 is lowered using a vacuum pump 330 associated with Box 27. This lowers the system pressure in both boxes and draws the steam and inerts remaining in Box 25 through Box 27 and then to the vacuum pump. This cools Box 25 (and thus Bed 21-1 Ring A) to a lower temperature (i.e. the saturation temperature at the partial pressure of the steam in the box) and reduces the potential for oxygen deactivation of the sorbent when the Bed 21-1 is placed back in the air stream. This process also pre-heats Box 27 (and thus Bed 22-1 Ring B) from ambient temperature up to the saturation temperature at the partial pressure of the steam in the box 250. Thus energy has been recovered and the amount of atmospheric pressure steam required to heat the second Box 27 (and Bed 22-1 Ring B) is reduced (FIG. 5D). As the vacuum pump 330 lowers pressure in the Boxes 25 and 27, the first Box 25 is reduced temperature (from 100° C. approx. to some intermediate temperature and the second Box 27 is increased in temperature (from ambient to the same intermediate temperature). $CO_2$ and inerts are removed from the system by the vacuum pump 330.

Figure 5E:
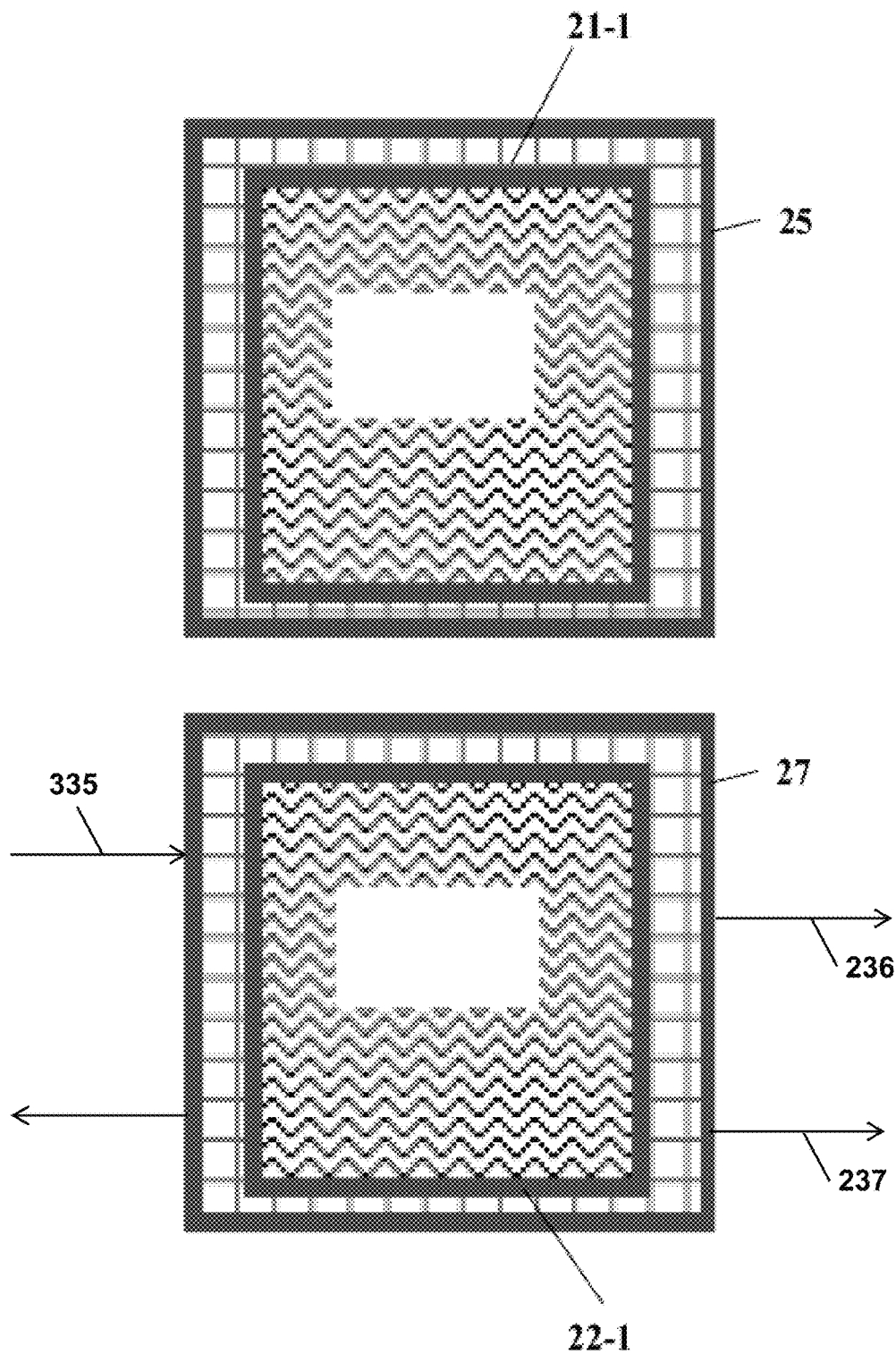
Figure 5F:
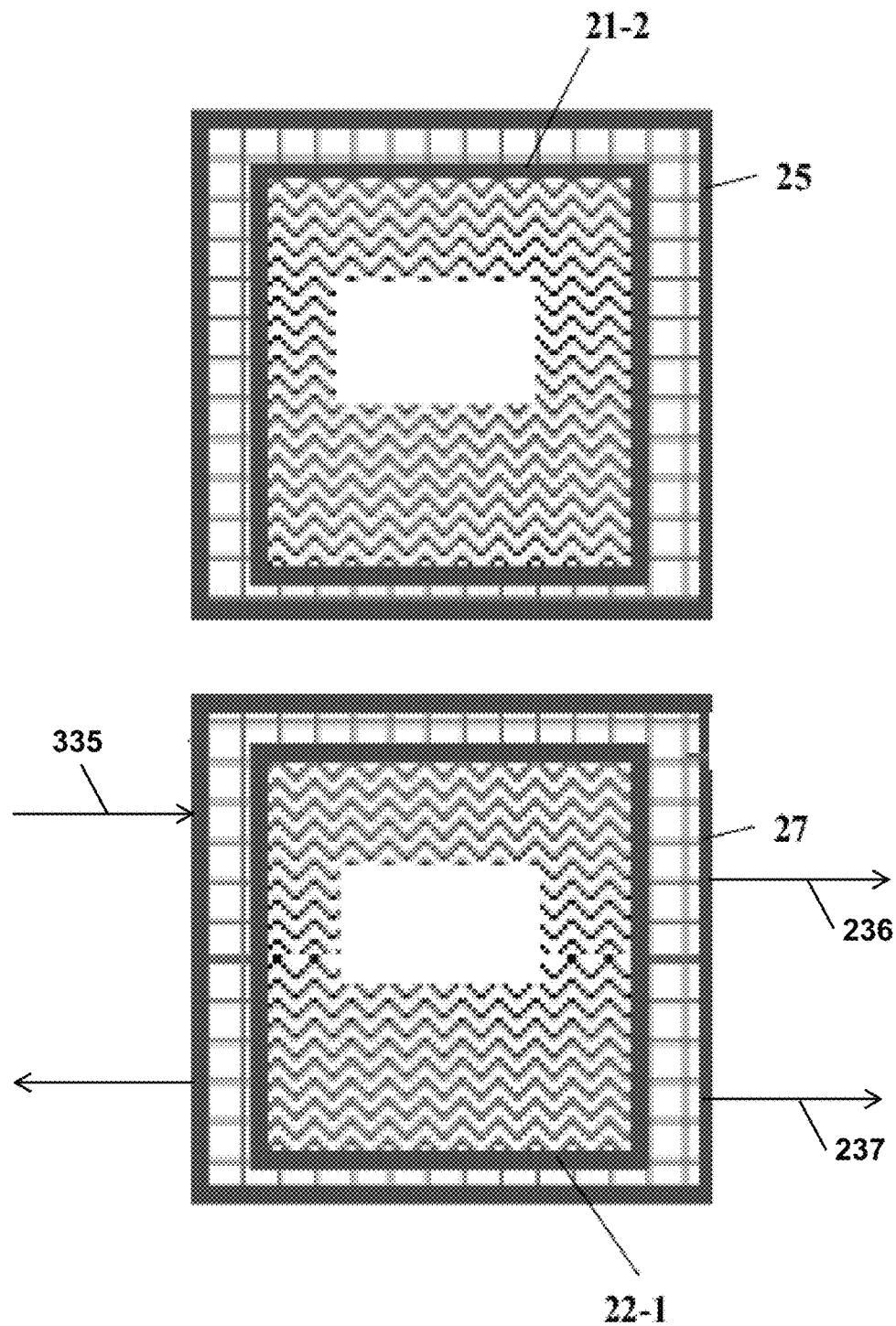

The valve between the first Box 25 and the second Box 27 is closed and the boxes isolated from each other. Bed 21-1 Ring A is now cooled below the temperature where oxygen deactivation of the sorbent is of concern when the bed is placed back in the air stream. The second Box 27 and Bed 22-1, Ring B, have been preheated and thus the amount of steam required for heating the Box and Bed is reduced (FIG. 5E). Bed 21-1 Ring A is then raised back into the bed assembly. The Ring A bed assembly is rotated by one bed and Bed 21-2 Ring A is then inserted into Box 25, where it is ready for preheating. Box 27 is heated with atmospheric steam and the stripped $CO_2$ is collected (FIG. 5F).

Figure 5G:
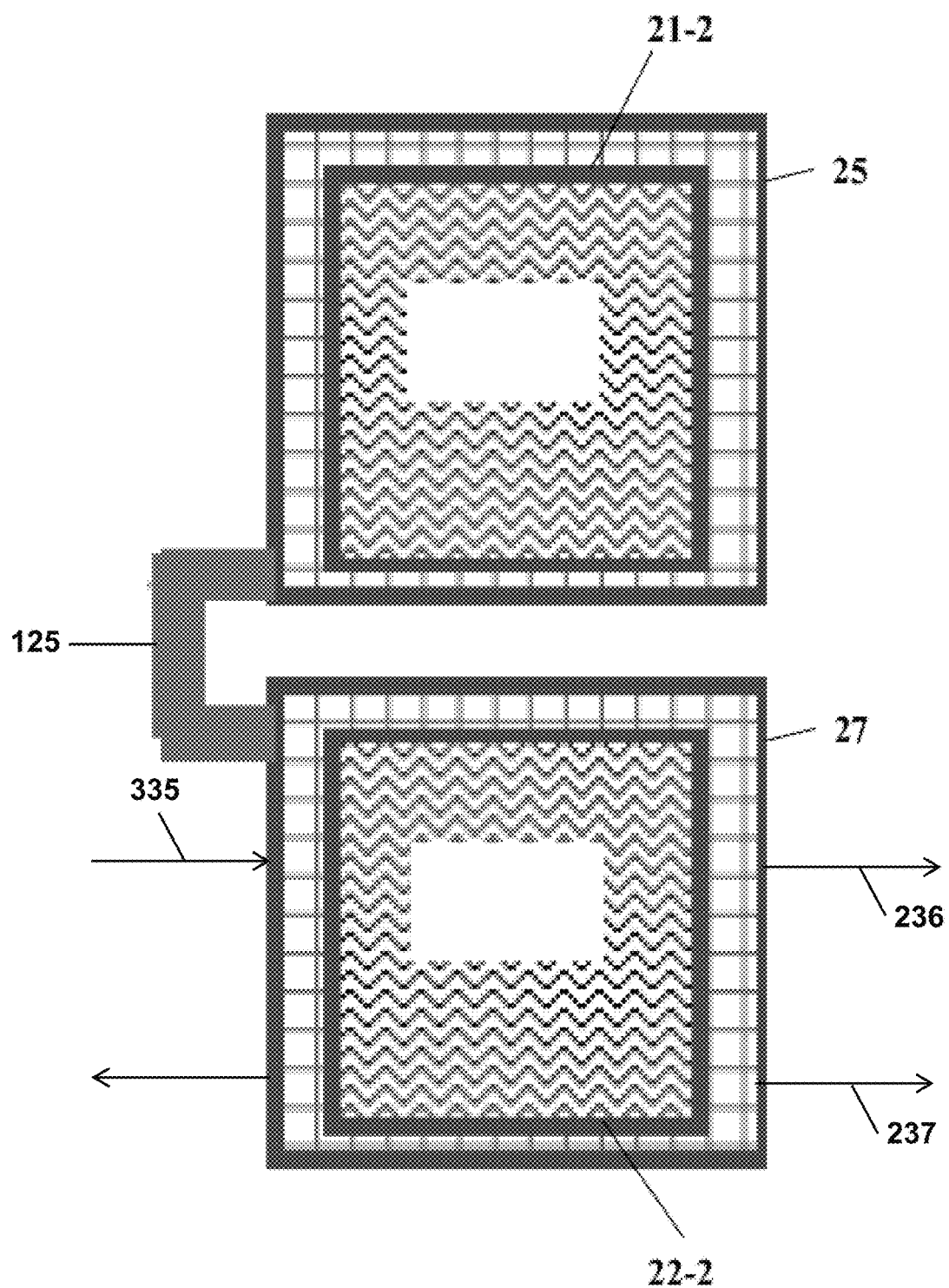
Figure 5H:
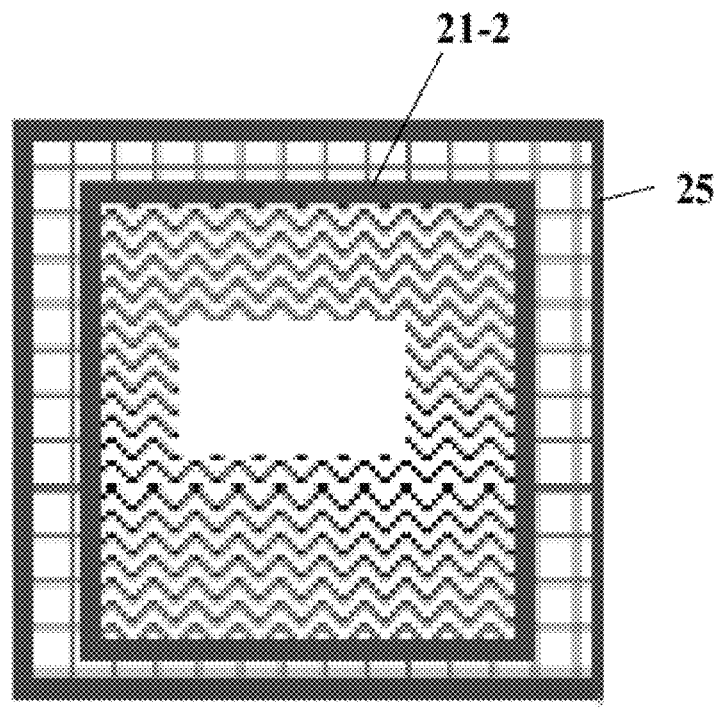
Figure 5H:
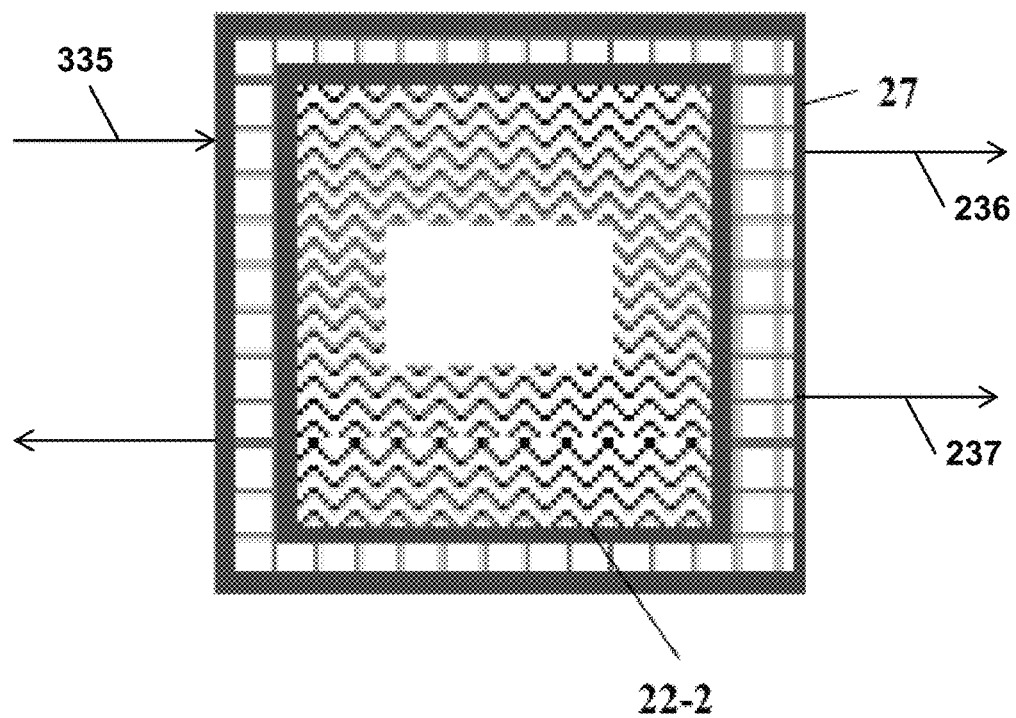

When the second Box 27 (containing Bed 22-1 Ring B) has been fully regenerated the steam supply to Box B is isolated and the piping for the $CO_2$ and condensate is isolated using valves 241, 242. The valving 126 between the first Box 25 and the second Box 27 is opened and the pressure in the Boxes 25, 27 is reduced using the vacuum pump 230 system for Box 25. The temperature of the second Box 27 (and thus Bed 22-1, Ring B) is reduced (see 5 above). The temperature of the first Box 25 (containing Bed 21-2, Ring A) is increased (see 5 above) (FIG. 5G). The vacuum pump 230 lowers pressure in Boxes 25, 27. Box 25 is reduced in temperature (from 100° C. approx. to some intermediate temperature). Box 27 is increased in temperature. (from ambient to the same intermediate temperature). $CO_2$ and inerts are removed from the system by the vacuum pump 230. Bed 22-1, Ring B, is raised back into the ring assembly and the assembly rotated one bed. Bed 22-2, Ring B, is then inserted into Box 27. Box 25 (containing Bed 21-2 Ring A) is heated with atmospheric steam to release the $CO_2$ and regenerate the sorbent (FIG. 5H). The pre-heating of Box 27 then occurs as described above. The process is repeated for all of the beds as the Decagons are rotated many times.

Design Parameters

The current basis for the design of the system is as follows:

Weight of individual monolith to be moved: 1,500-10,000 lbs. (including support structure)

Approximate size of bed: Width—5-6 meters

Height—9-10 meters

Depth—0.15-1 meter

It should be noted that the bed dimensions could be adjusted depending upon the particular conditions at the geographic location of each pair of systems, and the desired, or attainable, processing parameters.

For a system including 10 monoliths in each of the Decagon rings, the outer dimensions of a preferred circular/decagon structure would be about 15-17 meters, preferably about 16.5 meters. The monolith support structures could be individually driven, for example by an electric motor and drive wheel along the track, or the support structures could be secured to a specific location along the track and a single large motor used to drive the track and all of the structures around the closed loop. In either case, the regeneration box is placed at one location and all of the structures can stop their movement when one of the support structures is so placed as to be moved into the regeneration box. The economics of a single drive motor or engine, or multiple drive motors or engines, will depend on many factors, such as location and whether the driving will be accomplished by an electrical motor or by some fuel driven engine. The nature of the driving units is not itself a feature of this invention, and are all well-known to persons skilled in the art. Examples of suitable engines include internal or external combustion engines or gas pressure driven engines, for example operating using the Stirling engine cycle, or process steam engines or hydraulic or pneumatic engines.

When a regeneration box is located above the track level, the top will be about 20 meters above the grade of the track, and when the regeneration box is located below the grade of the track, the top of the box will be immediately below the track grade. A box on grade will only be minimally above the tops of the monoliths, so as to accommodate the monolith wholly within the box during regeneration.

Where the regeneration box is not on grade, the elevator system for moving the monolith into and out of the regeneration box should be able to accomplish the movement into and out of the box during a period within the range of 30 seconds to 120 seconds, and preferably between 30 and 45 seconds. The shorter the time period, the greater the flexibility in the process parameters that are available for the process. It is recognized that there are certain inherent mechanical limitations in moving the massive monoliths. One advantage where the regeneration box is on grade, is that vertical movement is not needed, as the monolith merely rotates into the box, as part of its rotational movement, and seals; thus avoiding the vertical movement, the loss of time and the additional capital cost of the elevators. In each case, the two edges of the bed are solid and form seals with the edges of the regeneration box.

Operational and Design Details
This section is divided into the following sub-sections:
Section i—Description of the overall system design and the use of the carburetor system for energy recovery
Section ii—Process description including simplified PFD and description of major items of equipment
Section iii—Conceptual mechanical design
Section iv—Issues that have to be examined in more detail to arrive at a final optimized design Discussion i. $CO_2$ Adsorption and Removal Process In the process of this invention, $CO_2$ is adsorbed from the atmosphere by passing air, or mixtures of air and effluent gases, through a sorbent bed, suitable sorbents preferably include amines, and preferably polyamines with at least a major proportion of the amine groups on the sorbent being primary amines. Once the $CO_2$ has been adsorbed by the sorbent it is stripped from the sorbent and collected, while the sorbent is regenerated. This step is performed by heating the sorbent with steam in a sealed containment, or regeneration, box. This releases the $CO_2$ and regenerates the sorbent. The $CO_2$ is collected and the sorbent is then available to re-adsorb $CO_2$ from the atmosphere. A limiting parameter on the process is that the sorbent can be de-activated if exposed to air at too elevated a temperature. Thus, usually the sorbent has to be cooled before it is returned to contacting the air stream. This is achieved, in accordance with the present invention, by lowering the pressure of the system so that the steam and water remaining in the regeneration box after the release of $CO_2$ evaporate, thus cooling the system to the saturation temperature of the steam at its new lowered partial pressure. Furthermore, as described below, the heat released in this process is used to pre-heat a $CO_2$-loaded sorbent bed, so as to provide approximately 50% sensible heat recovery, with a beneficial impact on energy and water use. This concept is useful even if an oxygen resistant sorbent is utilized to further lengthen the effective life of the sorbent and of the monolith substrate.

Generally, a longer time is required for adsorption of $CO_2$ from the air by the sorbent, than is required for the release of the $CO_2$ in the regeneration step. With the current generation of sorbent this difference will require an adsorption period approximately ten times greater for the adsorption step compared with that required for $CO_2$ release and sorbent regeneration. Thus a system with ten monoliths and a single regeneration unit has been adopted as the current basis. If a sorbent is operating in a system where it will have an adsorption period only approximately five times greater for the adsorption step compared with that required for $CO_2$ release and sorbent regeneration, the number of monoliths required in a system, for each regeneration box, could be reduced, e.g., to one regeneration box to serve 5 monoliths. This also depends upon the concentration of $CO_2$ in the gas mixture being treated, and the desorption period for any particular sorbent.

As discussed above, the regenerated sorbent bed is preferably cooled before it is exposed to air so as to avoid potential de-activation by the oxygen in the air. In accordance with this invention, this cooling is achieved by lowering the system pressure in the regeneration box, after regeneration has occurred, thus towering the steam saturation temperature. According to this invention, this is accomplished in a way that a significant amount of energy removed from the regenerated monolith during the de-pressurization step, is transferred to a second bed containing $CO_2$-loaded sorbent prior to its desorption step, thus providing some of the energy to heat the second bed to release the $CO_2$ and regenerate the sorbent. This heat transfer from one regeneration box to a second reduces the operating cost of providing solely fresh steam to heat the monolith bed. The remaining heat duty for the second box is achieved by adding atmospheric steam, but less is required thus saving costs. This process is repeated for alternate monoliths in each of the two boxes and improves the overall thermal efficiency of the system. This concept is shown in FIGS. 1 through 6, 11 and 12.

In the preferred embodiment as shown in these drawings, there are ten "monoliths" located in a decagon arrangement and which are located on a circular track. There are two circular/decagon assemblies associated with each process unit and they interact with each other (see FIG. 1 and FIGS. 5A-5H). Air is passed through the monoliths by induced draft tints preferably located opposite the radially inner surfaces of the monoliths. At one location the monoliths are adjacent to a box into which the monoliths are inserted, as shown by vertically moving the bed out from the track, for processing (i.e. where they are heated with steam to release the $CO_2$ from the sorbent and regenerate the sorbet. Alternatively, the box can be on grade, so that the monolith merely moves along the track into the regeneration box 1 or moves outwardly from the track, into a box, and on grade. The latter method reduces the energy used in moving the bed, while allowing the two regeneration boxes to be located adjacent, closer to each other.

The basic operational steps for the systems of FIGS. 1-4 and 11-12 as defined above would thus be:

1. Bed 21-1 (Ring A) after making one full rotation, is rotated into position and then moved, e.g., vertically into the Box 25 for processing, FIGS. 1-4 and 5.
2. Box 25 (containing Bed 21-1 (Ring A)) is heated with steam at atmospheric pressure and $CO_2$ generated is removed, FIG. 5A-H.
3. Bed 22-1 (Ring B) is placed in Box 27 while Box 25 is being processed to regenerate the sorbent.
4. The steam supply to Box 25 is stopped and the outlet piping for the $CO_2$ and condensate isolated. Box 25 and Box 27 are connected by opening valves in connecting piping 125.
5. The pressure in Box 27 is lowered using a vacuum pump 330 associated with Box 27. This lowers the system pressure in both boxes and draws the steam and inerts remaining in the regenerated Box 25 into the other Box 27 and then to the vacuum pump 330. This cools the regenerated Box 25 (and thus Bed 21-1 Ring A) to a lower temperature (i.e. the saturation temperature at the partial pressure of the steam in the box) and reduces the potential for oxygen deactivation of the sorbent when it is placed back in the air stream. This process also heats Box 27 (and thus Bed 22-1 Ring B) from its temperature after adsorption up to the saturation temperature at the partial pressure of the steam in the box 27. Thus energy has been recovered from the regenerated Box 25, and the amount of atmospheric pressure steam required to heat Box 27 (and thus Bed 22-1 Ring B) is reduced.
6. The valve 125 between the two Boxes 25, 27 is closed and the boxes isolated from each other. Bed 21-1, Ring A is now cooled below the temperature where oxygen deactivation of the sorbent is of concern when the bed is placed back in the air stream. The second Box 27 and Bed 22-1 Ring B have been preheated and thus the amount of steam required for heating the Box and Bed is reduced.

7. Bed 21-Il Ring A is then vertically moved back onto the Decagon track assembly. Box 27 is heated with atmospheric steam and the $CO_2$ is collected. The Ring A bed assembly is rotated by one bed and Bed 21-2 Ring A is then inserted into the regeneration Box 25, where it is ready for preheating. FIG. 5H.
8. When Box 27 (containing Bed 22-1 Ring B) has been fully regenerated the steam supply to Box 27 is isolated and the piping 337 for the $CO_2$ and condensate is closed using valves. The valving between the Box 25 and the regenerated Box 27 is opened and the pressure in Boxes 27, 25 is reduced using the vacuum pump 230 tor Box 25. The temperature of Box 27 (and thus Bed 22-1 Ring B) is reduced (see 5 above). The temperature of Box 25 (containing Bed 21-2 Ring A) is increased (see 5 above).
9. Bed 22-1 Ring B is raised back into the bed assembly and the assembly rotated one bed. Bed 22-2 Ring B is then inserted into Box 27, Box 25 (containing Bed 21-2 Ring A) is heated with atmospheric steam to release the $CO_2$ and regenerate the sorbent.

It is understood that reference to a "bed" includes both a monolithic substrate as well as an enclosed particulate bed held within the same size volume.

This process is repeated continually and the two ring track assemblies operate together, although the monoliths for each decagon are moved in and out of their boxes at slightly different times, so that the heat from cooling the earlier regenerated box preheats the later box when the later monolith is in place.

In FIGS. 1 and 2 the boxes are placed above the rotating bed assemblies (which are located at nominal grade) and the monoliths are moved up into the boxes. The only elevated structure is that required for the boxes, which are located above the rotating monoliths on a cantilevered structure.

In FIGS. 3 and 4 the boxes are located below grade and under the rotating bed assemblies. The boxes would be located in a single excavation with adequate access for maintenance and process piping.

In FIGS. 11 and 12, the boxes are located on grade, preferably over the track so that no additional vertical movement at the machinery is necessary. Alternatively, the regeneration box on grade can be located outwardly from the Decagons, and moved radially from the track.

in either case ancillary equipment (such as pumps, control systems, etc. see section 2) would be located at grade radially inside of the rotating bed assemblies.

ii. Process Equipment and Controls

FIG. 6 shows the general design from the proposed system:
  There are two decagons of monoliths in a single system.
    Thus a single system contains 20 (twenty) monoliths.
  There are nine fan installations for each decagon (there is no set of fans at the location where the monoliths are inserted into the boxes). At present it is preferred that there will be two vertically arranged axial fans associated with each bed of the size described above, i.e., a height of 10 meters and a width of 5 meters. Thus for a single system there will be 2×18=36 axial fans. However, the selection of the number and size of fans depends upon many factors.
  The nine fans per decagon each remain stationary (i.e. they will not rotate with the beds). Preferably a sealing system such as walls with a flexible end seal is provided with each fan, to minimize bypassing of the air around the monoliths. It is understood that the monoliths do not move continuously, but rather stop as one bed reaches the regeneration box location, and then restarts as that bed leaves the regeneration box. The stationary fans are located so that when a bed enters a regeneration box, each bed is located opposite to and sealed with a fan installation. Alternatively, the fans can be attached to the rotating bed structure and be fixed with the beds. In that case the number of fans would increase to 2×20=40 axial fans per single system. (See Section 3).
  There are two regeneration boxes 25, 27 in a single double track ring system; each box serves one of the decagons.
  The size of the monoliths is not standardized. As an initial estimate it should be assumed that each bed is 5 meters wide×10 meters tall by 1 meter deep. This initial size can be modified based upon economic analysis and other factors.
  Only the major valving is shown in FIG. 6 and additional valving, instrumentation, piping and controls are required for safe commercial operation, which are well known to the art.

During regeneration and $CO_2$ release from a bed, steam at atmospheric pressure and a temperature of 100° C.-120° C. is supplied directly to the regeneration Box 25, 27 containing the bed. The effect of the steam is to heat the bed and the box and release $CO_2$ and produce condensate. The condensate is removed to a collection system. The $CO_2$ is removed from the box, together with some steam and inerts, by the action of the $CO_2$ Blower 225, 227. The exhaust stream from the box is passed through a heat exchanger (condenser) 240 where the stream is cooled and further condensate is produced, which is sent to the condensate collection system 291. Finally the product $CO_2$ is sent via line 229 to storage and compression or can be used directly in another process, such as algae growth, without compression. The compression of the $CO_2$ is not included in the scope of this process description. Preferably, the air is at least partially withdrawn from the regeneration box 25, 27, after it is sealed with the bed, before the steam flow is started, especially where the $CO_2$ is to be compressed. Preferably, the pressure in the sealed regeneration box is reduced to not greater than 0.2 BarA before feeding the steam and stripping the $CO_2$. It is preferred that as much of the non-condensibles from air be removed as feasible, in order to reduce the cost of compression.

It is desirable to reduce the amount of water in the $CO_2$ exhaust stream after the condenser, as the more water present the higher will be the compression costs associated with storing the $CO_2$ product; more condensate will have to be removed in the inter-stage coolers of the compressors if not removed upstream. The amount of steam left in the exhaust stream sent to storage will be a function of the lowest temperature of coolant that is available and the size of the condenser that is installed. Determination of these values in any particular case is based upon an economic assessment of the relative costs of compression (capital and operating), coolant temperature (e.g. whether to use ambient air, cooling water or a refrigerant) and capital cost of the heat exchanger.

if correctly designed, the condenser should also be able to separate the liquid and vapor streams. However, a knock-out drum or similar type unit may be required to separate the liquid and vapor streams before the vapor stream is passed to the $CO_2$ Blower 225, 227.

The $CO_2$ Blower 225, 227 could be a liquid ring pump. If that type of unit is selected then it will be able to handle liquid condensate in the incoming feed and the condensate wilt be eliminated from the liquid ring system and sent to condensate storage. If a liquid ring type pump unit is not used then additional steps may be required to ensure that the vapor stream entering the blower does not contain a significant amount of liquid. Therefore, the selection of the type of unit used for the $CO_2$ Blower may have an impact on the design of the upstream equipment.

When the regeneration step is completed, all valving is closed and thus both boxes are isolated. In order to next cool the box and bed that have just finished the $CO_2$ release and sorbent regeneration step and pre-heat the other box and bed, which are at ambient temperature the following steps occur:

The isolation valve 126 between the boxes is opened

The vacuum pump 230, 330 associated with the bed at ambient conditions is turned on The effect of the vacuum pump is to draw the steam (initially at, e.g., atmospheric pressure and approximately 100° C.) from the box that has finished $CO_2$ production and bed regeneration (the "hot" box), into the box at ambient temperature. The lower pressure will cool the hot regenerated box and regenerated bed to a temperature substantially below the initial temperature after regeneration, i.e., approximately 100° C., due to the reduction in partial pressure of the steam which reduces the saturation temperature of the steam. As the vapor and steam are drawn from the "hot" box and bed this stream will start to heat the second box and bed (initially at ambient temperature) due to condensation of the steam on the walls of the box and inside the channels of the sorbent bed. As the vacuum pump operation continues, the pressure in both boxes decreases and reaches a final pressure (approximately 0.2 Bar A in the current example). At this point both boxes and their monoliths will be at approximately the same temperature (approximately 60° C. in the currently example). Thus the "hot" bed has been cooled to a temperature where, when it is returned to the air stream for further $CO_2$ adsorption, the sorbent will not be deactivated to any significant extent by the presence of oxygen in the air. Simultaneously, the bed at ambient temperature has been provided with a significant proportion of the heat needed to raise its temperature to approximately 100° C. for the $CO_2$ stripping from, and regeneration of, the sorbent. The final pressure to which the combined boxes will be brought is determined by the temperature restrictions on the sorbent in the presence of oxygen.

Once the defined pressure level in both boxes 25, 27 is reached the vacuum pump 230, 330 is stopped, the isolation valve 126 between the boxes is closed and the regeneration bed is returned to atmospheric pressure.

The cooled bed is returned to the ring track assembly, which assembly rotates until the next bed is moved into position to enter the box, and the rotation then stops.

The second box and bed in the second box 25, 27 that were pre-heated to approximately 60° C., is in the meantime supplied with atmospheric pressure steam and heated to 100° C. for $CO_2$ removal and sorbent regeneration. The $CO_2$, steam and inerts are removed by the $CO_2$ Vacuum Blower 225, 227 associated with that Box. (See text above and FIG. 6).

The process is then repeated continually, to alternatingly regenerate Boxes 25, 27.

It is possible that only a single $CO_2$ Blower and a single $CO_2$ Vacuum Pump could be used for each pair of regeneration boxes, a separate blower and pump for each box, or a central system, i.e. a single $CO_2$ Vacuum Pump 230, 330 and a single $CO_2$ Blower 225, 227 could be used to serve multiple system pairs.

FIGS. 1 and 2 show the conceptual mechanical design where there are two decagons in each system and where the beds are raised into or from the boxes which are located above the circular track system and supported by a cantilevered structural steel structure. FIGS. 3 and 4 show a similar concept except that the boxes are located below grade in a single excavation and the boxes are towered into the boxes. It is also feasible to have the box on grade, and merely rotate each bed into a sealed relationship with the box, as the ring rotates and then stops when the bed is sealed in the regeneration box.

FIG. 7A shows the conceptual design of the fan support system for the induced draft axial fans. Vertical walls 38 extending from each edge of the beds to a location radially inwardly of the fans (only one such wall is shown in FIG. 7A) along with a surface seal 136 where the walls contact the edge of the beds, plus top and bottom surfaces 36, 37 shown in cross-section, extending between the vertical walls, will prevent air from bypassing around the beds 21, 22, with the fans 26 remaining in a fixed position. Preferably, each of the walls 38 and top 36 and bottom 37 surfaces are provided with an elastomeric bumper 136 that would not contact the front of the bed 22 but which would press against the edges of the bed when the bed 21 was fully rotated into the air capture position.

Figure 7B:
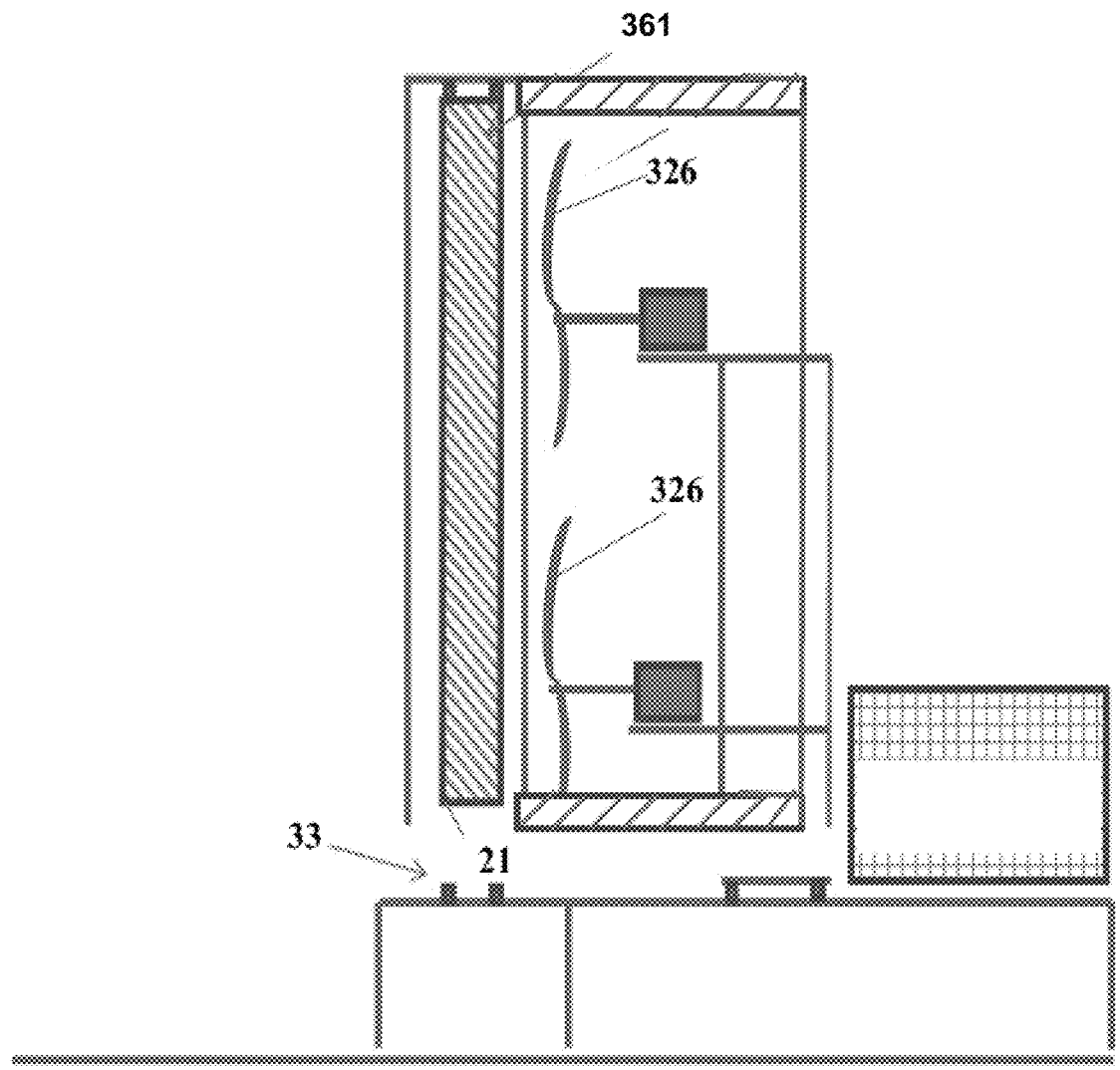

FIG. 7B shows a conceptual design where the fans 326 are rotated with their associated monoliths 21. This would require the fan support structures to be part of the ring rotation system and would increase the power required for rotating the monoliths, particularly the initial torque required to start the rotation. This option would allow the bypassing of air around the bed to be eliminated as the seals would be permanent and would not have to move.

FIGS. 8A, B and 9 show a conceptual arrangement of the fans 326 and plenums 425 that could be employed to ensure even distribution of the air across the monoliths using two flans per bed, when the beds are 10 meters tall.

The mechanical operations that will be required of the positioning system to ensure that the monoliths will be moved into and out of the boxes precisely include:

Rotation of the two sets of bed assemblies around a circular track on a support structure.

Precise location of the position where the monoliths are to be stopped so as to ensure the free movement of the monoliths into and out of the regeneration boxes, and into and out of the sealable relationships with the air guidance walls and seals, when the fans are stationary.

Removal of the bed from the bed assembly, insertion of the bed into the regeneration box, removal of the bed from the box and re-insertion of the bed onto the circular track assembly, where the bed is to be vertically moved. When the regeneration box is on grade, removal of the bed would not be necessary.

The monoliths are to be designed so that there is an air-tight seal between the monoliths and the internals of the box, and between the bed and the fan support structure when in the positions where air is passed through the bed. FIGS. 10A, 10B and 10C show conceptual designs for a side by side tapered seal system that will seal the bed in either the upper and lower regeneration box (FIG. 10A) positions of a regeneration box (FIG. 10B). FIG. 10C depicts an elevation side view.

Two seal systems are installed side by side on each bed frame, each matched with a channel 150 in a regeneration box. One channel is in the box and the other channel is in the ring assembly where the bed is located for $CO_2$ removal from the air stream.

Each of the channels 150 into which the seals will pass is also tapered. When inserted upwards the seal used is narrow at the top—relative to the channel which is wide at the bottom relative to the seat. This results in a tolerance for the seal to be inserted into the channel in which it will slide and seal. The channel into which the seal slides is also tapered to match the taper of the seal. As the bed is raised the gap between the channel and the seal narrows. This both gradually centers the bed in the correct location and also gradually decreases the gap between the seal and the channel. When fully raised the seal and the channel are the same width from top to bottom, the seal is tight against the channel, producing the seal, and the bed is located in exactly the correct position.

When inserted downwards, the other seal is used which is narrow at the bottom, which allows a tolerance for the seal to be inserted into the tapered channel (which is wide relative to the seal) and has the same taper as the seal) in the lower position within which it will slide and seal. As for the seal operation in the upward direction, the gap between the seal and the tapered channel will decrease as the bed moves into position, centering the bed and producing the required seal. In addition, there is also a seal focused between the bottom of the bed and the bottom of the regeneration box above the track and the top of the bed and the top of the regeneration box when the box is below the track as in FIGS. 3 and 4. When the regeneration box is on grade as in FIGS. 11-12, the edges or sides of the bed for the seal.

When designing the elevator system for vertical movement of the bed, either up or down, the approximate time period desired for bed vertical movement, for monoliths weighing about 10,000 lbs, and having the dimensions 5 ms×10 ms×1 m, between the track and the box—is 30 seconds to 120 seconds. The shorter this time period, the greater the flexibility in the process parameters that is available for the development of the process. It is for this reason that a regeneration box on grade holds some advantages.

4.1 Sorbent Properties and Bed Thickness

It should be understood that the specific dimensions and other numerical parameters set out above are based upon the use of the now conventional Polyethyleneamine ("PEA") as the sorbent. As improved sorbents are realized, that adsorb more quickly and/or are less susceptible to the effects of oxygen at elevated temperatures, for example, dimensions and temperatures of operation, as well as the number of beds per regeneration box and the speed of the beds around the track can change.

At present the pressure drop through the sorbent bed (which is usually a porous silica or alumina substrate with PEI present on its surfaces) is preferably limited to 1 inch $H_2O$ and, given the current structure of the sorbent bed and the superficial air velocity used for the design (2.5 m/s in the free duct) results in a defined depth in the direction of air flow) for the bed. This, in turn, affects the depth of the box. The assumed pressure drop, bed porosity, channel size, superficial air velocity can all be modified with changes in the sorbent and/or the substrate, so that in conjunction with the sorbent performance, that can result in a different preferred bed depth. One improved system is achieved by using a substrate formed from an alumina-coated silica with a primary amine polymer, such as a poly(allyl)amine, or one of its derivatives, coated on its surfaces.

4.2 Minimum Design Pressure-Regeneration Boxes

The most significant effect of the minimum design pressure selected will be on the cost of the boxes used for heating the sorbent monoliths. The minimum design pressure is selected based upon achieving a steam saturation temperature (at the steam partial pressure in the box at the minimum design pressure) such that the bed is cooled below the temperature at which significant deactivation of the sorbent occurs when it is exposed to oxygen in the air stream. The lower the pressure the thicker the plates and heavier the stiffening structures required for the box. Utilizing a primary polyamine, such as poly(allyl)amine, as now generally available, preferably the current minimum design pressure of 0.2 Bar A the box is required to be a large, heavy and expensive item of equipment even with a bed size of approximately 3 m×5 m×1 m. In a commercial unit it would be desirable to have a larger bed. However, as the bed size is increased the weight and cost of the box will increase in a power relationship (not linearly) with the dimensions of the box. In addition, a higher minimum design pressure would allow a greater amount of heat recovery, as the "cold" box could be heated to a higher temperature and less atmospheric steam would be required. Thus, being able to use a higher minimum design pressure (i.e. greater than 0.2 Bar A) would bring significant advantages, if a sorbent is used that would not be deactivated at the higher temperature.

4.3 Box Materials of Construction

When the regeneration box is constructed of carbon steel and stainless steel, it results in a structure that is heavy and expensive. Other construction materials include, for example, carbon fiber (or other man-made material), which would allow for savings in cost, as well as in weight.

4.4 Air Distribution Into and Out of Monoliths

It is essential that the air flow across the monoliths be as uniform as possible. The use of induced draft axial fans with suitably designed plenums to guide the air flow are useful in this context, and are used, for example, with petro-chemical air cooler installations.

A second issue associated with the air distribution involves the velocity of the air passing out of the circle of monoliths in the decagon system. Depending upon the ratio of the height of the bed to its width, the air velocity in the plume of air rising out of the circular opening formed by the tops of the monoliths may be high, and should be considered in the design of the fan plenums.

4.5 Use of a Single Outlet Plenum with the Potential for Energy Recovery

It is understood that if the size of the monoliths were to be reduced there is the potential to use a single very large axial fan installed horizontally in the circular opening at the top of the monoliths. This would draw air through the monoliths and then move all of the air vertically out of the assembly. There would be a plenum above the fan to guide the air and prevent re-circulation. In addition, the outlet plenum could be designed to achieve some energy recovery by using a small constriction and then an expansion, as is done in cooling towers with a similar fan and plenum arrangement. If the amount of air to be moved becomes too large then this option would not be practical.

4.6 Use of $CO_2$ Blower and Condensing System and Amount of Condensing Required Prior to $CO_2$ Blower In the current design there is a condenser 240 upstream of the $CO_2$ Blower 225. This removes water and reduces the vapor load on the blower. Alternatively, a single central condensing system can be used; that would process all of the $CO_2$ product streams from all of the units in multiple system pairs. This would reduce the complexity of the systems and reduce costs. However, the penalty for this would be that each $CO_2$ Blower would have to be designed to handle a wet vapor stream with a higher flowrate. Each system should be evaluated to determine the most economic option.

4.7 Use of Central $CO_2$ Vacuum Pump

During the de-pressurizing of the system and transferring heat from the "hot" regeneration box to the "cold" regeneration box, a $CO_2$ Vacuum Pump 230 is used. In the preferred design shown, a vacuum pump is associated with each regeneration box. Under certain circumstances one $CO_2$ Vacuum Pump can serve for both of the boxes in the two-ring system. In addition, a single large $CO_2$ Vacuum Pump serving multiple systems can be used. Reducing the number of vacuum pumps should reduce the capital cost associated with the system.

Preferably, the use of a liquid ring type pump would appear to be advantageous as any condensate produced will be contained in the liquid ring system and more readily removed.

4.8 Bed Removal/Sorbent Replacement

The sorbent monoliths will have to be serviced during the life of the process. This would involve maintenance activities on the bed movement systems (both rotational and vertical), replacement of the sorbent and maintenance, etc. These activities might be performed with the monoliths in position or they may require that the monoliths be removed from the assembly. Removal of the monoliths is achieved by installing a second lift system which could then move the monoliths out from the track for access.

Alternatively, the monoliths could be designed to be removed using a crane. Other options are available.

With the foregoing disclosure in mind, it is believed that various other ways of operating multiple bed systems for removing carbon dioxide from a gaseous mixture, in accordance with the principles of this application, will become apparent to those skilled in the art, including the use of many conventional steps and components that are or shall become well-known and would be useful in carrying out the present invention without themselves being a part of the invention. The scope of this invention is to be determined only in accordance with the scope of the following claims.

I claim:

1. A system for removing carbon dioxide from a carbon dioxide laden gas mixture, the system comprising two groups of individual carbon dioxide removal structures, each individual removal structure within each group comprising a porous solid substrate supported on the removal structure, each porous substrate having a sorbent supported upon its surfaces, the sorbent being capable of adsorbing or binding to carbon dioxide, to remove carbon dioxide from a gas mixture; a closed loop support for each of the groups of the removal structures, the closed loop supports being so arranged as to permit movement of the individual removal structures of each group along the closed loop and a sealable regeneration box at one location along each of the closed loop supports, into which a removal structure can be sealably placed, such that when a removal structure is sealed in place therein, carbon dioxide sorbed upon the sorbent is stripped from the sorbent and captured, and the sorbent regenerated; the sealable regeneration box further comprising a sealable conduit connecting the regeneration box to a source of process steam, and a conduit connecting to an exhaust pump for removing gases from the regeneration box; each of the removal structures supporting the porous substrates in a position along the closed loop support outside of the regeneration box such that at least one major surface of the substrate is being exposed to a stream of the carbon dioxide laden gas mixture and the opposed major surface of the substrate is being directly exposed to the atmosphere; such that when the sorbent is exposed to a flow of carbon dioxide laden gas mixture it allows for the removal of $CO_2$ from the gas mixture; the number of removal structures to the number of regeneration boxes being directly determined by the ratio of the adsorption time (for removing $CO_2$ from the gas mixture) to the regeneration time (for stripping $CO_2$ from the sorbent on the porous substrate), the adsorption time being the time to adsorb, on the sorbent, $CO_2$ from a gas mixture from a base level to a desired level on the sorbent, and the regeneration time being the time to strip the $CO_2$ from the desired level back to the base level on the sorbent.

2. The system of claim 1, wherein each of the two groups of carbon dioxide removal structures comprises one regeneration box and between five and ten removal structures.

3. The system of claim 1, wherein each of the regeneration boxes and the removal structures further comprise interacting fluid seals, such that fluid-tight seals are formed when a removal structure is held within the regeneration box.

4. The system of claim 1, further comprising a sealable fluid connection between each regeneration box and an exhaust pump for reducing the atmospheric pressure within the sealed regeneration box after a removal structure is sealed within the regeneration box.

5. The system of claim 4, further comprising a sealable fluid connection between each of the regeneration boxes, and a source of process heat steam for each regeneration box; and a sealable fluid connection between each regeneration box and a $CO_2$ collection chamber.

6. The system of claim 1, wherein the regeneration box for each group of carbon dioxide removal structures is located at a vertically different level than the removal structures further comprising elevating apparatus for vertically moving a carbon dioxide removal structure into and out of a sealable position within a regeneration box.

7. The system of claim 2, further comprising fans drawing in ambient air for admixture with a high concentration $CO_2$ gas mixture to create a flow of a carbon dioxide laden gas mixture through each of the removal structures in order to allow the sorbent to adsorb the $CO_2$ from the gas mixture.

8. The system of claim 1, further comprising a sealable fluid conduit between the two regeneration boxes, and wherein the rotational movement of each of the two groups of carbon dioxide removal structures is off-set such that a carbon dioxide removal structure enters one of the regeneration boxes after the regeneration of a carbon dioxide removal structure in the other regeneration box has started.

9. The system of claim 7, wherein the fans are stationary and located at positions radially inwardly of the endless loop support such that when one of the carbon dioxide removal structures in the group of carbon dioxide removal structure is within the regeneration box for that group, each of the other carbon dioxide removal structures is in a sealed position with one of the fans to receive the flow of carbon dioxide-laden gas mixture.

10. The system of claim 7, wherein the fans are located radially inwardly of the closed curve track, and are each attached to one of the carbon dioxide removal structures so as to move around the enclosed curve with its carbon dioxide removal structure.

* * * * *